US012709679B2

(12) United States Patent
Okitsu

(10) Patent No.: US 12,709,679 B2
(45) Date of Patent: Aug. 18, 2026

(54) POLYETHYLENE POWDER AND MOLDED ARTICLE

(71) Applicant: Asahi Kasei Kabushiki Kaisha, Tokyo (JP)

(72) Inventor: Naoya Okitsu, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 598 days.

(21) Appl. No.: 18/036,241

(22) PCT Filed: Nov. 15, 2021

(86) PCT No.: PCT/JP2021/041875

§ 371 (c)(1),
(2) Date: May 10, 2023

(87) PCT Pub. No.: WO2022/113794

PCT Pub. Date: Jun. 2, 2022

(65) Prior Publication Data

US 2023/0407064 A1 Dec. 21, 2023

(30) Foreign Application Priority Data

Nov. 26, 2020 (JP) ................................ 2020-196103

(51) Int. Cl.
*C08L 23/06* (2006.01)
*H01M 50/417* (2021.01)

(52) U.S. Cl.
CPC .......... *C08L 23/06* (2013.01); *H01M 50/417* (2021.01); *C08L 2203/20* (2013.01)

(58) Field of Classification Search
CPC .......... C08L 23/04; C08L 23/06; C08L 23/08; C08L 23/0807; C08L 23/0815; C08L 23/0823; C08L 23/083; C08L 23/0829; C08L 23/0846; C08L 23/0853; C08L 23/0861; C08L 23/0869; C08L 23/0876; C08L 23/0884; C08F 10/02; C08F 110/02; C08F 210/02; C08J 2323/04; C08J 2323/06; H01M 50/417
See application file for complete search history.

(56) References Cited

U.S. PATENT DOCUMENTS

| | | | |
|---|---|---|---|
| 2008/0241510 | A1 | 10/2008 | Van Marion et al. |
| 2012/0202044 | A1 | 8/2012 | Brant et al. |
| 2015/0065595 | A1 | 3/2015 | Nasu et al. |
| 2016/0137760 | A1 | 5/2016 | Kuwata |
| 2017/0101492 | A1 | 4/2017 | Yanagimoto et al. |
| 2019/0248979 | A1 | 8/2019 | Mochizuki et al. |
| 2019/0359740 | A1 * | 11/2019 | Tanaka .................... C08F 6/003 |
| 2020/0017614 | A1 * | 1/2020 | Mochizuki ............ C08F 110/02 |
| 2024/0026089 | A1 | 1/2024 | Okitsu |

FOREIGN PATENT DOCUMENTS

| | | | | |
|---|---|---|---|---|
| CN | 116508203 | A | 7/2023 | |
| EP | 3037471 | A1 * | 6/2016 | ............. C08L 23/04 |
| EP | 3366708 | B1 | 1/2024 | |
| JP | 2015-120784 | A | 7/2015 | |
| JP | 5840743 | B2 | 1/2016 | |
| JP | 2016-094554 | A | 5/2016 | |
| JP | 2018-002759 | A | 1/2018 | |
| JP | 2018-090744 | A | 6/2018 | |
| JP | 2019-038931 | A | 3/2019 | |
| JP | 2020-180234 | A | 11/2020 | |
| WO | 2015/147186 | A1 | 10/2015 | |
| WO | 2018/088209 | A1 | 5/2018 | |
| WO | 2020/189443 | A1 | 9/2020 | |
| WO | 2021/241411 | A1 | 12/2021 | |

OTHER PUBLICATIONS

Bremner,T. et al. Journal of Polymer Science Part B: Polymer Physics vol. 34 pp. 1893-1902 (Year: 1996).*
International Search Report issued in corresponding International Patent Application No. PCT/JP2021/041875 dated Feb. 1, 2022.
International Preliminary Report on Patentability and Written Opinion issued in International Patent Application No. PCT/JP2021/041875 dated Jun. 8, 2023.
Uehara et al., "Solid-state 1H-NMR relaxation behavior for ultra-high-molecular weight polyethylene reactor powders with different morphologies," Polymer Journal, 44 (8): 795-801 (2012).
Li et al., "Heterogeneous distribution of chain mobility in nascent UHMWPE in the less entangled state," Journal of Polymer Research, 25 (11): 239 (2018).
Supplementary European Search Report issued in European Patent Application No. 21897768.4 dated Apr. 3, 2024.

* cited by examiner

*Primary Examiner* — Jeffrey S Lenihan
(74) *Attorney, Agent, or Firm* — Morgan, Lewis & Bockius LLP

(57) ABSTRACT

A polyethylene powder, wherein, when a free induction decay curve obtained by the Carr-Purcell-Meiboom-Gill method in pulsed NMR is subjected to three-component approximation, the relaxation time T of each component and the abundance R of each component satisfy the following <requirement (1)> and <requirement (2)>:

<Requirement (1)>

An entanglement index at 180° C. determined by (formula I) is 12 to 25 ms:

$$(\text{entanglement index})=T_\alpha\times R_\alpha/(R_\alpha+R_\beta)+T_\beta\times R_\beta/(R_\alpha+R_\beta) \quad \text{(formula I)}$$

$T_\alpha$: relaxation time (ms) of low-mobility component α
$R_\alpha$: abundance (%) of low-mobility component α
$T_\beta$: relaxation time (ms) of intermediate component β
$R_\beta$: abundance (%) of intermediate component β

<Requirement (2)>

An intermediate component ratio at 180° C. determined by (formula II) is 0.25 to 0.5:

$$(\text{intermediate component ratio})=R_\beta/(R_\alpha+R_\beta) \quad \text{(formula II).}$$

11 Claims, No Drawings

POLYETHYLENE POWDER AND MOLDED ARTICLE

TECHNICAL FIELD

The present invention relates to a polyethylene powder and a molded article.

BACKGROUND ART

Ultra-high-molecular-weight polyethylene powders are molded by various molding methods, such as melt drawing, injection molding, extrusion, and compression molding, and used for various applications, such as films, sheets, microporous membranes, fibers, foams, and pipes.

In recent years, demand for polyethylene powders is increasing for applications, such as microporous membranes and fibers. In particular, there is rapidly increasing demand for polyethylene powders as raw materials for separators, which are important components of lithium-ion batteries and lead-acid batteries.

Since ultra-high-molecular-weight polyethylene powders are highly viscous when melted and inferior in molding processability, when microporous membranes and high-strength fibers are produced, wet extrusion processing is generally used to extrude the polyethylene powders while dissolving them in predetermined solvents. In wet extrusion processing, if the dispersibility of polyethylene powders in solvents is poor, the localization of high-molecular-weight components in molded articles causes dimensional irregularities in width, thickness, etc., and the generation of unmelted materials, leading to deterioration of the physical properties and appearance of the molded articles. Therefore, improvement of the dispersibility of polyethylene powders in solvents has been required.

When a microporous membrane produced by using a polyethylene powder is used as a battery separator, the membrane is required to have a function to allow only ions to pass through while separating the positive and negative electrodes to prevent short circuit, a shutdown function to prevent the battery reaction from going out of control by blocking the passage of ions by melting the pores when a large current flows, in other words, a function to close the pores at a temperature lower than the temperature at which a thermal runaway occurs, a so-called fuse effect, and to also have high mechanical strength.

In recent years, demand for higher capacity and higher output is rapidly increasing, mainly for automotive batteries. Along with this increasing demand, battery separators are required to have further improved mechanical strength and dimensional stability. Further, accompanying the increase in electrode capacity, expansion and contraction of electrodes increase during charging and discharging; thus, creep resistance that can withstand long-term stress has become even more important for battery separators.

Patent Literature 1 discloses a technique of obtaining a film and a microporous membrane that have high permeability, a low heat shrinkage rate, excellent mechanical strength, and excellent heat resistance by using a polyolefin resin containing an ultra-high-molecular-weight ethylene polymer having a specific intrinsic viscosity and a specific melting point.

Further, Patent Literature 2 discloses a technique of obtaining a microporous film having excellent molding processability, high air permeability, and excellent mechanical strength by using a polyethylene resin composition comprising an ethylene homopolymer having a specific melt flow rate, a specific molecular weight distribution, and a specific elution volume measured by cross-fractionation chromatography.

CITATION LIST

Patent Literature

Patent Literature 1: Japanese Patent Laid-Open No. 2018-090744

Patent Literature 2: Japanese Patent No. 5840743

SUMMARY OF INVENTION

Technical Problem

However, although the microporous membrane obtained by the technique disclosed in Patent Literature 1 has excellent mechanical strength and dimensional stability, no consideration has been made to improve molding processability and creep resistance. There are problems that mechanical strength may be uneven, and that the membrane may not be able to withstand long-term stress caused by electrode expansion and contraction associated with charging and discharging.

The technique disclosed in Patent Literature 2 achieves both molding processability and mechanical strength; however, there is a problem that no consideration has been made to improve dimensional stability and creep resistance.

Accordingly, an object of the present invention is to provide a polyethylene powder that can achieve both excellent molding processability and high mechanical strength, and that can give a microporous membrane having excellent dimensional stability and creep resistance.

Solution to Problem

As a result of extensive research to achieve the above object, the present inventor has found that it is possible to solve the problems of the prior art described above by using a polyethylene powder in which, when a free induction decay curve obtained by the Carr-Purcell-Meiboom-Gill method in pulsed NMR is subjected to three-component approximation, the relaxation time T and the abundance R of each component satisfy predetermined relationships. Thus, the present invention has been completed.

Specifically, the present invention is as described below.

[1]

A polyethylene powder, wherein, when a free induction decay curve obtained by the Carr-Purcell-Meiboom-Gill method in pulsed NMR is subjected to three-component approximation, the relaxation time T of each component and the abundance R of each component satisfy the following <requirement (1)> and <requirement (2)>:

<Requirement (1)>

An entanglement index at 180° C. determined by the following (formula I) is 12 ms or more and 25 ms or less:

$$(\text{entanglement index})=T_\alpha\times R_\alpha/(R_\alpha+R_\beta)+T_\beta\times R_\beta/(R_\alpha+R_\beta) \quad \text{(formula I)}$$

$T_\alpha$: relaxation time (ms) of low-mobility component α

$R_\alpha$: abundance (%) of low-mobility component α

$T_\beta$: relaxation time (ms) of intermediate component 3

$R_\beta$: abundance (%) of intermediate component 3

<Requirement (2)>

An intermediate component ratio at 180° C. determined by the following (formula II) is 0.25 or more and 0.5 or less:

$$\text{(intermediate component ratio)}=R_\beta/(R_\alpha+R_\beta) \quad \text{(formula II).}$$

[2]

The polyethylene powder according to [1], wherein regarding the abundance R of each component determined by subjecting a free induction decay curve obtained by the Carr-Purcell-Meiboom-Gill method in pulsed NMR to three-component approximation, the rate of change in the abundance of the low-mobility component at 180° C. is −5% or more 10% or less.

[3]

The polyethylene powder according to [1] or [2], wherein regarding the abundance R of each component determined by subjecting a free induction decay curve obtained by the Carr-Purcell-Meiboom-Gill method in pulsed NMR to three-component approximation, the rate of change in the abundance of the high-mobility component at 180° C. is 50% or less.

[4]

The polyethylene powder according to any one of [1] to [3], which has an isothermal crystallization time at 125° C. of 5 minutes or less.

[5]

The polyethylene powder according to any one of [1] to [4], which has a viscosity average molecular weight of 200,000 or more and 10,000,000 or less.

[6]

The polyethylene powder according to any one of [1] to [5], which has a median diameter of 50 μm or more and 250 m or less.

[7]

The polyethylene powder according to any one of [1] to [6], which is for use in a battery separator.

[8]

A molded article of the polyethylene powder according to any one of [1] to [7].

[9]

The molded article according to [8], which is a microporous membrane.

[10]

The molded article according to [8], which is a fiber.

[11]

The molded article according to [8], which is a battery separator.

Advantageous Effect of Invention

The present invention can provide a polyethylene powder that can achieve both excellent molding processability and high mechanical strength, and that can give a microporous membrane having excellent dimensional stability and creep resistance.

DESCRIPTION OF EMBODIMENTS

An embodiment for carrying out the present invention (hereinafter also referred to as "the present embodiment") will be described in detail below.

The present embodiment below is an example for explaining the present invention, and is not intended to limit the present invention to the following contents. The present invention can be modified in various ways within the scope of the gist thereof.

[Polyethylene Powder]

The polyethylene powder of the present embodiment is characterized in that when a free induction decay curve obtained by the Carr-Purcell-Meiboom-Gill method in pulsed NMR is subjected to three-component approximation, the relaxation time T of each component and the abundance R of each component satisfy the following <requirement (1)> and <requirement (2)>.

As for the abundance R (%), the sum of three components is taken as 100%.

<Requirement (1)>

An entanglement index at 180° C. determined by the following (formula I) is 12 ms or more and 25 ms or less:

$$\text{(entanglement index)}=T_\alpha\times R_\alpha/(R_\alpha+R_\beta)+T_\beta\times R_\beta/(R_\alpha+R\beta) \quad \text{(formula I)}$$

$T_\alpha$: relaxation time (ms) of low-mobility component α

$R_\alpha$: abundance (%) of low-mobility component α

$T_\beta$: relaxation time (ms) of intermediate component 3

$R_\beta$: abundance (%) of intermediate component β

<Requirement (2)>

An intermediate component ratio at 180° C. determined by the following (formula II) is 0.25 or more and 0.5 or less:

$$\text{(intermediate component ratio)}=R_\beta/(R_\alpha+R_\beta) \quad \text{formula (II)}$$

The above configuration of the polyethylene powder of the present embodiment results in effects that excellent molding processability and high mechanical strength can be both achieved, and that a microporous membrane having excellent dimensional stability and creep resistance can be obtained.

The configuration of the polyethylene powder of the present embodiment will be described below.

The polyethylene powder of the present embodiment (hereinafter also simply referred to as "the powder") is formed by an ethylene-based polymer.

Examples of the ethylene-based polymer include an ethylene homopolymer, and a copolymer of ethylene and other comonomers copolymerizable with ethylene (e.g., a binary or ternary copolymer).

The bonding form of the copolymer may be random or block.

Examples of other comonomers include, but are not particularly limited to, α-olefins, and vinyl compounds. Other comonomers can be used singly or in combination of two or more.

Examples of α-olefins include, but are not particularly limited to, $C_{320}$ α-olefins, and specific examples include propylene, 1-butene, 4-methyl-1-pentene, 1-hexene, 1-octene, 1-nonene, 1-decene, 1-undecene, 1-dodecene, 1-tridecene, and 1-tetradecene. Among these, other comonomers are preferably propylene and/or 1-butene, in terms of further enhancing the heat resistance and strength of the microporous membrane.

Examples of vinyl compounds include, but are not particularly limited to, vinyl cyclohexane, styrene, and derivatives thereof.

If necessary, non-conjugated polyenes, such as 1,5-hexadiene and 1,7-octadiene, may also be used as other comonomers.

(Entanglement Index and Intermediate Component Ratio at 180° C.)

A known index for estimating the entanglement of molecular chains in the polyethylene powder is, for example, evaluation of dynamic viscoelasticity.

In the evaluation of dynamic viscoelasticity, the degree of entanglement of molecular chains is evaluated from the responsiveness of resin when stress is added to the resin; thus, it is possible to determine the average degree of entanglement of molecular chains in the entire resin. However, when controlling multiple physical properties, such as mechanical characteristics and molding processability, at the same time, it is preferable to separately treat multiple entangled components present in the resin. For this reason, the average degree of entanglement of molecular chains alone is not sufficient as an index.

In order to identify raw materials suitable for molded articles with well-controlled physical properties, such as mechanical characteristics and molding processability, the present inventor used, as indexes that can separately evaluate multiple molecular chain-entangled components present in the resin, an entanglement index and an intermediate component ratio, both calculated from pulsed NMR measurements at 180° C., in combination to accurately evaluate the degree of entanglement of the polyethylene powder.

The method used in the pulsed NMR measurements was the Carr-Purcell-Meiboom-Gill method, which is a measurement method suitable for mobility evaluation of polymers with active molecular chain movement, e.g., rubbery polymers.

As a result, it was found that a polyethylene powder in which when a free induction decay curve obtained by the Carr-Purcell-Meiboom-Gill method in pulsed NMR is subjected to three-component approximation, the relaxation time T and the abundance R of each component satisfy the following <requirement (1)> and <requirement (2)> at the same time, was surprisingly suitable as a raw material for microporous membranes, in terms of mechanical characteristics and molding processability.

<Requirement (1)>

An entanglement index at 180° C. determined by the following (formula I) is 12 ms or more and 25 ms or less:

$$(\text{entanglement index})=T_{\alpha}\times R_{\alpha}/(R_{\alpha}+R_{\beta})+T_{\beta}\times R_{\beta}/(R_{\alpha}+R_{\beta}) \qquad \text{(formula I)}$$

$T_{\alpha}$: relaxation time (ms) of low-mobility component α

$R_{\alpha}$: abundance (%) of low-mobility component α

$T_{\beta}$: relaxation time (ms) of intermediate component 3

$R_{\beta}$: abundance (%) of intermediate component 3

<Requirement (2)>

An intermediate component ratio at 180° C. determined by the following (formula II) is 0.25 or more and 0.5 or less:

$$(\text{intermediate component ratio})=R_{\beta}/(R_{\alpha}+R_{\beta}) \qquad \text{(formula II)}$$

In the polyethylene powder of the present embodiment, the range of the entanglement index at 180° C. determined by the above (formula I) is 12 ms or more and 25 ms or less, preferably 13 ms or more and 22 ms or less, and more preferably 14 ms or more and 20 ms or less.

In the polyethylene powder of the present embodiment, when a free induction decay curve obtained by the Carr-Purcell-Meiboom-Gill method in pulsed NMR is subjected to three-component approximation, the low-mobility component α corresponds to a part where molecular chains are strongly entangled in the polyethylene powder, and this component is considered to tend to remain in the microporous membrane without being dissolved during molding. On the other hand, the intermediate component β in the polyethylene powder of the present embodiment corresponds to a part where molecular chains are more weakly entangled compared with the low-mobility component α, and this component is considered to be easily dissolved during molding. The stronger the degree of entanglement of each component, the smaller the value of the relaxation time T.

Because the entanglement index at 180° C. determined by the formula (I) is 12 ms or more, the stress remaining after molding is reduced; thus, it tends to be possible to obtain a microporous membrane with excellent dimensional stability.

In contrast, because the entanglement index at 180° C. determined by the formula (I) is 25 ms or less, the degree of entanglement of molecular chains in the polyethylene powder becomes strong; thus, the microporous membrane obtained by molding tends to have high mechanical strength and exhibit excellent creep resistance.

In the polyethylene powder of the present embodiment, when a free induction decay curve obtained by the Carr-Purcell-Meiboom-Gill method in pulsed NMR is subjected to three-component approximation, the intermediate component ratio at 180° C. determined by the above (formula II) is 0.25 or more and 0.5 or less, preferably 0.25 or more and 0.45 or less, and even more preferably 0.3 or more and 0.4 or less.

Because the intermediate component ratio at 180° C. determined by the (formula II) is 0.25 or more, the molding processability of the polyethylene powder increases, and it tends to be possible to obtain a microporous membrane with an excellent appearance.

In contrast, because the intermediate component ratio at 180° C. is 0.5 or less, a moderate amount of molecular chain entanglement points remains in the microporous membrane obtained by molding; thus, stress easily propagates, and creep resistance tends to be excellent.

In general, when the degree of entanglement of molecular chains in the polymer is strong, the mechanical strength of the obtained microporous membrane is enhanced; however, molding processability deteriorates due to the low dispersibility of molecular chains in the polymer, and irregularities in thickness etc. occur when a microporous membrane is produced. Thus, if there are irregularities in the thickness etc. of the microporous membrane, a portion with weak mechanical strength is formed, which is likely to serve as the starting point of deterioration.

In contrast, when the degree of entanglement of molecular chains in the polymer is weak, molding processability is excellent, whereas mechanical strength is reduced.

In the polyethylene powder of the present embodiment, the strength of the entanglement of molecular chains in the polymer is well controlled. Therefore, when a microporous membrane is produced, it is possible to enhance both mechanical strength and molding processability.

If there are many entanglement points of polymer molecular chains in the microporous membrane, mechanical strength is high and stress easily propagates, so that creep resistance is excellent; however, residual stress is large, which tends to deteriorate dimensional stability. Deterioration of dimensional stability leads to short circuit and degradation when the microporous membrane is used as a battery separator.

In contrast, if there are few entanglement points of polymer molecular chains, dimensional stability is excellent; however, it tends not to exhibit sufficient mechanical strength. In addition, since stress is difficult to propagate, local loads are likely to be applied. When the microporous membrane is used as a battery separator, it tends to be unable to withstand changes in electrode volume that accompany charging and discharging.

In the polyethylene powder of the present embodiment, the amount of entanglement points of polymer molecular chains is well controlled; thus, it is possible to ensure excellent dimensional stability as well as sufficient mechanical strength and creep resistance.

In order for the entanglement index at 180° C. determined by the above (formula I) and the intermediate component ratio determined by the above (formula II) to show values within the specific ranges described above, it is necessary that the entanglement of molecular chains strongly entangled in the polyethylene powder has a certain degree of strength, and that the ratio of weakly entangled molecular chains is large.

One of the characteristics of the polyethylene powder that satisfies these requirements is that, for example, multiple polymer components with different entanglement states are contained.

As the methods for controlling the entanglement index at 180° C. determined by the above (formula I) and the intermediate component ratio determined by the above (formula II), for example, the catalyst state is changed during polymerization of polyethylene, or multiple catalyst components with greatly different polymerization behaviors are mixed.

Specifically, for example, after polymerization is performed under high-pressure conditions in the first half of the polymerization using a polymerization catalyst containing a fragile carrier with large pores, the slurry concentration in the polymerization reactor is adjusted to 40 mass % or more; after a polymerization catalyst containing a fragile carrier with large pores is pre-polymerized, the stirring speed in the polymerization reactor is set to 300 rpm or more; or a mixture of multiple catalysts with significantly different distributions of active species on the carrier surface is used.

Due to the use of a carrier with large pores in the synthesis of a polymerization catalyst used in the polymerization reaction of polyethylene, the amount of active species supported in the pores increases, and in the polymerization reaction of polyethylene, the polymerization of polyethylene in the pores can be accelerated. Further, in the space within the narrow pores, the growing molecular chains of polyethylene tend to intersect with each other; thus, it is possible to polymerize components with a strong degree of entanglement of molecular chains.

In contrast, due to the fragile structure of the carrier used in the polymerization catalyst, the pressure increase in the pores accompanying the growth of the polyethylene molecular chains makes the catalyst fragile during polymerization of polyethylene.

In addition, when the catalyst cracks due to the increase in the stirring intensity, the growing molecular chains of polyethylene are less likely to intersect with each other, and it is possible to polymerize components with a weak degree of entanglement of molecular chains.

Furthermore, by adding a thickener after carrier synthesis or by reducing the pressure difference between the transfer source and the transfer destination when the catalyst is transferred, the catalyst carrier can be prevented from cracking before the polymerization process, and multiple polyethylene components with different degrees of entanglement of molecular chains can be produced during polymerization.

Pulsed NMR applied to the measurement of the polyethylene powder of the present embodiment is specifically measured in the following manner.

First, a sample tube filled with the polyethylene powder to a height of 1 cm from the bottom is placed in a TD-NMR system produced by Bruker (model: minispec mq20), which has been set so that the internal temperature of the sample tube is 30° C., and the sample tube is heated according to the <heating conditions> shown below.

The temperatures shown in the following <heating conditions> are values obtained by measuring the internal temperature of the sample with a thermocouple.

<Heating Conditions>

(1) Set to 30° C. and allow to stand for 5 minutes.

(2) Heat up to 180° C. at a rate of 5° C./min.

(3) After heating to 180° C., allow to stand for 25 minutes.

After completion of the temperature rise according to the above procedure, the spin-spin relaxation time ($T_2$, which is also referred to simply as "the relaxation time T" in the present specification) of polyethylene is measured according to the <measurement conditions> shown below.

Further, after completion of the measurement, the same measurement is repeated 3 times, and a total of 4 measurements are performed.

<Measurement Conditions>

Magnetic field strength: 0.47 T

Nuclide to be measured: $^{1}H$ (20 MHz)

Measurement method: Carr-Purcell-Meiboom-Gill method

Cumulative number: 256 times

Repeat time: 3 seconds

Interval (τ) between first 90° pulse and 180° pulse: 0.04 milliseconds

Total number of echo signals: 6400

The free induction decay (FID) obtained by the 4th measurement out of the above 4 measurements is subjected to curve fitting using an analysis program TD-NMR-A produced by Bruker.

For fitting, the function shown in the following <formula 1> is used.

$$f(t)=R_\alpha\exp(-t/T_\alpha)+R_\beta\exp(-t/T_\beta)+R_\gamma\exp(-t/T_\gamma) \quad \text{<Formula 1>}$$

(provided that $R_\alpha+R_\beta+R_\gamma=100$)

t: variable (elapsed time from pulse irradiation)

$T_\alpha$: relaxation time (ms) of low-mobility component α

$R_\alpha$: abundance (%) of low-mobility component α

$T_\beta$: relaxation time (ms) of intermediate component 3

$R_\beta$: abundance (%) of intermediate component $ $T_\gamma$: relaxation time (ms) of high-mobility component 7

$R_\gamma$: abundance (%) of high-mobility component 7

Finally, from the relaxation time T and abundance R obtained by curve fitting of the free induction decay, the entanglement index and intermediate component ratio are respectively calculated by (formula I) and (formula II) shown below.

$$\text{(Entanglement index)}=T_\alpha\times R_\alpha/(R_\alpha+R_\beta)+T_\beta\times R_\beta/(R_\alpha+R_\beta) \quad \text{(formula I)}$$

$$\text{(Intermediate component ratio)}=R_\beta/(R_\alpha+R_\beta) \quad \text{(formula II)}$$

In general, in the case of a rubbery polymer with active molecular chain movement, free induction decay obtained by pulsed NMR measurement can be represented by an exponential function. Therefore, the free induction decay obtained by this measurement can also be fitted as the sum of three different components represented by exponential functions, as shown in the above <formula 1>.

It is known that the higher the mobility of $^{1}H$, that is, the higher the mobility of molecular chains, the slower the decay rate of free induction decay. Since the relaxation time T in each exponential function was in the relationship of $T_\alpha<T_\beta<T_\gamma$, the component with the lowest mobility was taken as α, the component with intermediate mobility was taken as β, and the component with the highest mobility was taken as γ.

The component α corresponded to a part with molecular chains strongly entangled in the polyethylene powder, the component β corresponded to a part with weakly entangled molecular chains, and the component γ was a part with unentangled molecular chains.

More specifically, the entanglement index and intermediate component ratio at 180° C. in the present embodiment can be measured by the methods described in the Examples.

(Rate of Change in Abundance of Low-Mobility Component at 180° C.)

In the polyethylene powder of the present embodiment, regarding the abundance R of each component obtained by subjecting a free induction decay curve obtained by the Carr-Purcell-Meiboom-Gill method in pulsed NMR to three-component approximation, the range of the rate of change in the abundance of the low-mobility component α at 180° C. is preferably −5% or more and 10% or less, more preferably −2% or more and 8% or less, and even more preferably 0% or more and 6% or less.

In the polyethylene powder of the present embodiment, the rate of change in the abundance of the low-mobility component at 180° C. is determined in the following manner.

When the above-mentioned (entanglement index and intermediate component ratio at 180° C.) are determined, the free induction decay (FID) obtained from the first and fourth measurements out of the pulsed NMR measurements specifically shown above is subjected to curve fitting using an analysis program TD-NMR-A produced by Bruker. For fitting, the function shown in the above <formula 1> is used.

From the abundance R obtained by fitting, the rate of change (%) in the abundance of the low-mobility component is calculated by the following (formula III).

$$(\text{Rate of change in abundance of low-mobility component})=((R_{\alpha 4}-R_{\alpha 1})/R_{\alpha 1})\times 100 \quad \text{(formula III)}$$

$R_{\alpha 1}$: abundance of the low-mobility component α in the first measurement $R_{\alpha 4}$: abundance of the low-mobility component α in the fourth measurement This rate of change shows a negative value when the entanglement of the molecular chains of the strongly entangled component is broken under heating conditions, and shows a positive value when the molecular chains of the weakly entangled component are strongly entangled.

Because the rate of change in the abundance of the low-mobility component is −5% or more, the strongly entangled component tends to remain even after molding, and a microporous membrane with more excellent mechanical strength and creep resistance can be obtained. In contrast, because the rate of change in the abundance of the low-mobility component is 10% or less, it is possible to keep the ratio of weakly entangled molecular chains and unentangled molecular chains equal to or above a certain level, and molding processability tends to be excellent.

The rate of change in the abundance of the low-mobility component at 180° C. in the polyethylene powder of the present embodiment can be specifically measured by the method described in the Examples.

The rate of change in the abundance of the low-mobility component at 180° C. in the polyethylene powder of the present embodiment can be controlled within the above numerical range, for example, by adjusting the concentration and temperature during synthesis of the catalyst carrier to certain values or more.

(Rate of Change in Abundance of High-Mobility Component at 180° C.)

In the polyethylene powder of the present embodiment, regarding the abundance R of components obtained by subjecting a free induction decay curve obtained by the Carr-Purcell-Meiboom-Gill method in pulsed NMR to three-component approximation, the range of the rate of change in the abundance of the high-mobility component at 180° C. is preferably 50% or less, more preferably 10% or less, and even more preferably 5% or less. The lower limit is not particularly limited, and is generally 0% or more.

The rate of change in the abundance of the high-mobility component in the polyethylene powder of the present embodiment is determined in the following manner.

When the above-mentioned (entanglement index and intermediate component ratio at 180° C.) are determined, the free induction decay (FID) obtained from the first and fourth measurements out of the pulsed NMR measurements specifically shown above is subjected to curve fitting using an analysis program TD-NMR-A produced by Bruker.

For fitting, the function shown in the above <formula 1> is used.

From the abundance R obtained by fitting, the rate of change (%) in abundance of the high-mobility component shown in the following (formula IV) is calculated.

$$(\text{Rate of change in abundance of high-mobility component})=((R_{\gamma 4}-R_{\gamma 1})/R_{\gamma 1})\times 100 \quad \text{(formula IV)}$$

$R_{\gamma 1}$: abundance of the high-mobility component 7 in the first measurement $R_{\gamma 4}$: abundance of the high-mobility component 7 in the fourth measurement The rate of change takes a larger value as the entanglement of molecular chains is broken under heating conditions.

Because the rate of change in the abundance of the high-mobility component is 50% or less, components with entanglement of molecular chains tend to remain even after molding, and a microporous membrane with more excellent mechanical strength and creep resistance can be obtained.

The rate of change in the abundance of the high-mobility component at 180° C. in the polyethylene powder of the present embodiment can be specifically measured by the method described in the Examples.

The rate of change in the abundance of the high-mobility component at 180° C. in the polyethylene powder of the present embodiment can be controlled within the above numerical range, for example, by adjusting the slurry concentration and stirring speed during polymerization to appropriate ranges.

(Isothermal Crystallization Time at 125° C.)

The polyethylene powder of the present embodiment preferably has an isothermal crystallization time of 5 minutes or less, more preferably 4.5 minutes or less, and even more preferably 4 minutes or less.

The lower limit of the isothermal crystallization time is not particularly limited, and is generally 0 minutes or more.

The isothermal crystallization time at 125° C. in the polyethylene powder of the present embodiment is determined in the following manner using a differential scanning calorimeter (DSC).

First, an aluminum pan enclosing the polyethylene powder is placed in a heating furnace, and heating operations are performed according to the <heating and cooling conditions> shown below. However, the heating operations are performed in a nitrogen atmosphere.

<Heating and Cooling Conditions>

(1) Hold at 50° C. for 1 minute.

(2) Heat up to 180° C. at a rate of 200° C./min.

(3) Hold at 180° C. for 5 minutes.

(4) Cool down to 125° C. at a rate of 80° C./min.

Then, the time at which the temperature reaches 125° C. is taken as the starting point (0 minutes), and the time at which the exothermic peak top caused by crystallization is obtained is taken as the isothermal crystallization time at 125° C.

Because the isothermal crystallization time at 125° C. is 5 minutes or less, components with entanglement of molecular chains tend to exist evenly in the molded article, so that stress easily propagates, and a microporous membrane with more excellent creep resistance can be obtained.

As the method for controlling the isothermal crystallization time at 125° C. in the polyethylene powder of the present embodiment, for example, active sites are uniformly supported on the catalyst carrier used in the polymerization process of the polyethylene powder, or the temperature in the polymerization reactor is uniformly adjusted.

The isothermal crystallization time at 125° C. in the polyethylene powder of the present embodiment can be specifically measured by the method described in the Examples.

(Viscosity Average Molecular Weight (Mv))

The viscosity average molecular weight (Mv) of the polyethylene powder of the present embodiment is preferably 200,000 or more and 10,000,000 or less, more preferably 250,000 or more and 3,000,000 or less, and even more preferably 300,000 or more and 2,000,000 or less.

The viscosity average molecular weight (Mv) of the polyethylene powder can be controlled within the above numerical range by appropriately adjusting the polymerization conditions described later.

Specifically, the viscosity average molecular weight (Mv) can be controlled within the above numerical range, for example, by allowing hydrogen to be present as a chain transfer agent in the polymerization system or changing the polymerization temperature.

Because the polyethylene powder of the present embodiment has a viscosity average molecular weight (Mv) of 200,000 or more, the microporous membrane containing the polyethylene powder of the present embodiment has sufficient mechanical strength.

In contrast, because the viscosity average molecular weight (Mv) is 10,000,000 or less, the polyethylene powder of the present embodiment tends to have excellent molding processability, such as dispersibility in solvents and stretchability. Therefore, microporous membranes molded by using the polyethylene powder of the present embodiment have few thickness irregularities and unmelted materials, are less likely to deteriorate, and have an excellent appearance.

The viscosity average molecular weight (Mv) of the polyethylene powder of the present embodiment can be calculated by the following formula from the intrinsic viscosity [η] (dL/g) determined according to ISO1628-3 (2010).

More specifically, the viscosity average molecular weight can be measured by the method described in the Examples.

$$Mv=(5.34\times10^{4})\times[\eta]^{1.49}$$

(Median Diameter)

In the polyethylene powder of the present embodiment, the range of the median diameter is preferably 50 m or more and 250 m or less, more preferably 60 m or more and 200 m or less, and even more preferably 70 m or more and 150 μm or less.

The median diameter of the polyethylene powder of the present embodiment is the particle diameter (D50) at which the cumulative mass is 50%.

Because the median diameter is 50 km or more, the ease of handling the polyethylene powder (improvement of fluidity, suppression of dust, etc.) in the production process and extrusion process is improved.

In contrast, because the median diameter is 250 m or less, a plasticizer is likely to impregnate the polyethylene powder, and molding processability tends to become better.

As the method for controlling the median diameter of the polyethylene powder of the present embodiment within the above numerical range, for example, the particle diameter of the polymerization catalyst is controlled, or the polymerization conditions, described later, are adjusted so as to prevent the rapid progress of the polymerization reaction (hereinafter also referred to as rapid polymerization).

The median diameter of the polyethylene powder of the present embodiment can be specifically measured by the method described in the Examples, described later.

[Method for Producing Polyethylene Powder]

The method for producing the polyethylene powder of the present embodiment will be described below.

(Catalyst Component)

The catalyst component used in the production of the ethylene-based polymer that constitutes the polyethylene powder of the present embodiment is not particularly limited, and it is possible to use a Ziegler-Natta catalyst or a metallocene catalyst produced by the method disclosed in Japanese Patent No. 5782558 or Japanese Patent Laid-Open No. 2019-19265. In particular, it is preferable to use a Ziegler-Natta catalyst.

The Ziegler-Natta catalyst used in the production of the polyethylene powder of the present embodiment is preferably, for example, a catalyst for olefin polymerization comprising a solid catalyst component [A] and an organometallic compound component [B], wherein the solid catalyst component [A] is produced in such a manner that an organomagnesium compound (A-1) represented by the following (formula i) and soluble in inert hydrocarbon solvents is reacted with a chlorinating agent (A-2) represented by the following (formula ii) to prepare a carrier (A-3), and an organomagnesium compound (A-4) represented by the following (formula iii) and soluble in inert hydrocarbon solvents and a titanium compound (A-5) represented by the following (formula iv) are supported on the carrier (A-3).

$$(A\text{-}1):(M^1)_\gamma(Mg)_\delta(R^1)_e(R^2)_f(OR^3)_g \quad \text{(formula i)}$$

(in formula i, $M^1$ is a metal atom belonging to any one selected from the group consisting of groups 12, 13, and 14 of the periodic table, $R^1$, $R^2$, and $R^3$ are each a hydrocarbon group having 2 or more and 20 or less carbon atoms, and γ, δ, e, f, and g are real numbers that satisfy the following relationship:

$$0\leq\gamma,0<\delta,0\leq e,0\leq f,0\leq g,0<e+f,0\leq g/(\gamma+\delta)\leq2,k\gamma+2\delta=e+f+g$$

(wherein k represents the valence of $M^1$).)

$$(A\text{-}2):\ H_hSiCl_iR^4_{(4-(h+i))} \quad \text{(formula ii)}$$

(in formula ii, $R^4$ is a hydrocarbon group having 1 or more and 12 or less carbon atoms, and h and i are real numbers that satisfy the following relationship: $0<h$, $0<i$, $0<h+i\leq4$)

$$(A\text{-}4):(M^2)_\alpha(Mg)_\beta(R^4)_a(R^5)_bY^1_c \quad \text{(formula iii)}$$

(in formula iii, $M^2$ is a metal atom belonging to any one selected from the group consisting of groups 12, 13, and 14 of the periodic table, $R^4$ and $R^5$ are hydrocarbon groups having 2 or more and 20 or less carbon atoms, $Y^1$ is any of alkoxy, siloxy, aryloxy, amino, amido, —N═C—$R^6$, $R^7$, —$SR^8$ (wherein $R^6$, $R^7$, and $R^8$ represent hydrocarbon groups having 1 or more and 20 or less carbon atoms, and when c is 2, each $Y^1$ may be different), and a β-keto acid residue, and α, β, a, b, and c are real numbers that satisfy the following relationship:

$$0 \leq \alpha, 0 < \beta, 0 \leq a, 0 \leq b, 0 \leq c, 0 < a+b, 0 \leq c/(\alpha+\beta) \leq 2, n\alpha+2\beta=a+b+c$$

(wherein n represents the valence of $M^2$).)

$$\text{(A-5): } Ti(OR^9)_d X^1_{(4-d)} \quad \text{(formula iv)}$$

(in formula iv, d is a real number of 0 or more and 4 or less, $R^9$ is a hydrocarbon group having 1 or more and 20 or less carbon atoms, and $X^1$ is a halogen atom.)

First, the organomagnesium compound (A-1) will be described.

The organomagnesium compound (A-1) is presented in the form of an organomagnesium complex compound soluble in inert hydrocarbon solvents, but includes all dihydrocarbyl magnesium compounds and complexes of these compounds with other metal compounds.

The symbols γ, δ, e, f, and g in the above (formula i) and the above relational expression kγ+2δ=e+f+g represent the stoichiometric characteristics of the valences of metal atoms and substituents.

In the above (formula i), the hydrocarbon groups represented by $R^1$ and $R^2$ are not particularly limited, but are, for example, each independently an alkyl group, a cycloalkyl group, or an aryl group. Examples include methyl, ethyl, propyl, butyl, propyl, hexyl, octyl, decyl, cyclohexyl, and phenyl groups.

Among these, $R^1$ and $R^2$ are each preferably an alkyl group.

When γ>0, the metal atom $M^1$ can be a metal atom belonging to any one selected from the group consisting of groups 12, 13, and 14 of the periodic table. Examples include zinc, boron, aluminum, and the like. In particular, aluminum and zinc are preferred.

The ratio δ/γ of magnesium to metal atom $M^1$ is not particularly limited, but is preferably 0.1 or more and 30 or less, and more preferably 0.5 or more and 10 or less.

When a predetermined organomagnesium compound wherein γ=0 is used as (A-1), this compound is soluble in an inert hydrocarbon solvent, for example, when $R^1$ is a 1-methylpropyl group. Such a compound also gives favorable results in the production of the polyethylene powder of the present embodiment.

In the above (formula i), the hydrocarbon groups $R^1$ and $R^2$ when γ=0 are each preferably any one of the three groups (1), (2), and (3) shown below.

Group (1):

At least one of $R^1$ and $R^2$ is a secondary or tertiary alkyl group having 4 or more and 6 or less carbon atoms. It is preferable that $R^1$ and $R^2$ both have 4 or more and 6 or less carbon atoms, and that at least one of them is a secondary or tertiary alkyl group.

Group (2):

$R^1$ and $R^2$ are alkyl groups with different carbon numbers. It is preferable that $R^1$ is an alkyl group having 2 or 3 carbon atoms, and that $R^2$ is an alkyl group having 4 or more carbon atoms.

Group (3):

At least one of $R^1$ and $R^2$ is a hydrocarbon group having 6 or more carbon atoms. Preferred is an alkyl group in which the total number of carbon atoms contained in $R^1$ and $R^2$ is 12 or more.

The hydrocarbon groups $R^1$ and $R^2$ in the above (formula i) when γ=0 are specifically shown below.

In the group (1), examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. In particular, a 1-methylpropyl group is preferred.

In the group (2), examples of the alkyl group having 2 or 3 carbon atoms include ethyl, 1-methylethyl, and propyl groups.

In particular, an ethyl group is preferred.

Examples of the alkyl group having 4 or more carbon atoms include, but are not particularly limited to, butyl, pentyl, hexyl, heptyl, and octyl groups.

In particular, butyl and hexyl groups are preferred.

In the group (3), examples of the hydrocarbon group having 6 or more carbon atoms include, but are not particularly limited to, hexyl, heptyl, octyl, nonyl, decyl, phenyl, and 2-naphthyl groups. Preferred among hydrocarbon groups are alkyl groups, and more preferred among alkyl groups are hexyl and octyl groups.

In general, when the number of carbon atoms contained in the alkyl group increases, it tends to dissolve easily in inert hydrocarbon solvents, and the viscosity of the solution tends to increase. Therefore, as the hydrocarbon groups $R^1$ and $R^2$ in the above (formula i), it is preferable to use appropriately long-chain alkyl groups in terms of handling. The organomagnesium compound (A-1) is used as an inert hydrocarbon solution; however, a small amount of Lewis basic compounds, such as ether, ester, and amine, may be contained or remain in the solution without any problem.

Next, the alkoxy group ($OR^3$) in the (formula i) of the organomagnesium compound (A-1) will be described.

The hydrocarbon group represented by $R^3$ is preferably an alkyl group or aryl group having 1 or more and 12 or less carbon atoms, and more preferably an alkyl group or aryl group having 3 or more and 10 or less carbon atoms.

$R^3$ is not particularly limited, and examples include methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups.

In particular, butyl, 1-methylpropyl, 2-methylpentyl, and 2-ethylhexyl groups are more preferred.

The method for synthesizing the organomagnesium compound (A-1) is not particularly limited. For example, it is synthesized by reacting any organomagnesium compound belonging to the group consisting of formula: $R^1MgX^1$ and formula: $R^1_2Mg$ ($R^1$ is as defined above, and $X^1$ is a halogen atom) with any organometallic compound belonging to the group consisting of formula: $M^1R^2_k$ and formula: $M^1R^2_{(k-1)}H$ ($M^1$, $R^2$, and k are as defined above) in an inert hydrocarbon solvent at a temperature of 25° C. or more and 150° C. or less, optionally followed by reaction with an alcohol having a hydrocarbon group represented by $R^2$ ($R^2$ is as defined above) or an alkoxymagnesium compound having a hydrocarbon group represented by $R^2$ and soluble in inert hydrocarbon solvents, and/or an alkoxyaluminum compound.

Among the above methods, when an organomagnesium compound soluble in inert hydrocarbon solvents and an alcohol are reacted, the order of reaction is not particularly limited. The alcohol may be added to the organomagnesium compound, the organomagnesium compound may be added to the alcohol, or both may be added at the same time.

The reaction ratio of the organomagnesium compound soluble in inert hydrocarbon solvents and the alcohol is not particularly limited; however, in an alkoxy group-containing organomagnesium compound obtained by the reaction, the molar composition ratio of the alkoxy group to all metal atoms: $g/(\gamma+\delta)$ is $0 \leq g/(\gamma+\delta) \leq 2$, and preferably $0 \leq g/(\gamma+\delta) < 1$.

Next, the chlorinating agent (A-2) will be described.

The chlorinating agent (A-2) is a silicon chloride compound represented by (formula ii) and having at least one Si—H bond.

$$\text{(A-2): } H_hSiCl_iR^4_{(4-(h+i))} \qquad \text{(formula ii)}$$

(in formula ii, $R^4$ is a hydrocarbon group having 1 or more and 12 or less carbon atoms, and h and i are real numbers that satisfy the following relationship: $0<h$, $0<i$, $0<h+i \leq 4$.)

In the above (formula ii), the hydrocarbon group represented by $R^4$ is not particularly limited, and examples include aliphatic hydrocarbon groups, alicyclic hydrocarbon groups, and aromatic hydrocarbon groups. Specific examples include methyl, ethyl, propyl, 1-methylethyl, butyl, pentyl, hexyl, octyl, decyl, cyclohexyl, and phenyl groups.

In particular, alkyl groups having 1 or more and 10 or less carbon atoms are preferred, and alkyl groups having 1 to 3 carbon atoms, such as methyl, ethyl, propyl, and 1-methylethyl groups, are more preferred. Further, h and i are numbers greater than 0 that satisfy the relationship: $h+i \leq 4$, and i is preferably 2 or more and 3 or less.

The chlorinating agent (A-2) is not particularly limited, and examples include $HSiCl_3$, $HSiCl_2CH_3$, $HSiCl_2C_2H_5$, $HSiCl_2(C_3H_7)$, $HSiCl_2(2\text{-}C_3H_7)$, $HSiCl_2(C_4H_9)$, $HSiCl_2(C_6H_5)$, $HSiCl_2(4\text{-}Cl—C_6H_4)$, $HSiCl_2(CH{=}CH_2)$, $HSiCl_2(CH_2C_6H_5)$, $HSiCl_2(1\text{-}C_{11}H_7)$, $HSiCl_2(CH_2CH{=}CH_2)$, $H_2SiCl(CH_3)$, $H_2SiCl(C_2H_5)$, $HSiCl(CH_3)_2$, $HSiCl(C_2H_5)_2$, $HSiCl(CH_3)(2\text{-}C_3H_7)$, $HSiCl(CH_3)(C_6H_5)$, $HSiCl(C_6H_5)_2$, and the like.

As the chlorinating agent (A-2), any of these compounds or a silicon chloride compound comprising a mixture of two or more members selected from these compounds is used.

In particular, $HSiCl_3$, $HSiCl_2CH_3$, $HSiCl(CH_3)_2$, and $HSiCl_2(C_3H_7)$ are preferred; and $HSiCl_3$ and $HSiCl_2CH_3$ are more preferred.

Next, the reaction between the organomagnesium compound (A-1) and the chlorinating agent (A-2) will be described.

In the reaction, the chlorinating agent (A-2) is preferably used after being diluted with an inert hydrocarbon solvent, a chlorinated hydrocarbon such as 1,2-dichloroethane, o-dichlorobenzene, or dichloromethane, an ether-based solvent such as diethyl ether or tetrahydrofuran, or a mixed solvent thereof. Among these, an inert hydrocarbon solvent is more preferably used in terms of catalyst performance.

The reaction ratio of the organomagnesium compound (A-1) and the chlorinating agent (A-2) is not particularly limited; however, the number of moles of silicon atoms contained in (A-2) per mole of magnesium atoms contained in (A-1) is preferably 0.01 mol or more and 100 mol or less, and more preferably 0.1 mol or more and 10 mol or less.

The method for reacting the organomagnesium compound (A-1) and the chlorinating agent (A-2) is not particularly limited, and any of the following methods can be used: a simultaneous addition method in which (A-1) and (A-2) are simultaneously introduced into the reactor and reacted, a method of introducing (A-1) into the reactor after (A-2) is placed in the reactor in advance, and a method of introducing (A-2) into the reactor after (A-1) is placed in the reactor in advance.

In particular, the method of introducing (A-1) into the reactor after (A-2) is placed in the reactor in advance is preferred.

The carrier (A-3) obtained by the above reaction is preferably separated by filtration or decantation, and then sufficiently washed with an inert hydrocarbon solvent to remove unreacted products or by-products, etc.

The temperature of the reaction between the organomagnesium compound (A-1) and the chlorinating agent (A-2) is not particularly limited, but is preferably 75° C. or more and 150° C. or less, more preferably 80° C. or more and 120° C. or less, and even more preferably 80° C. or more and 100° C. or less, in terms of enlarging the pores of the carrier (A-3) and making it fragile.

In the simultaneous addition method in which (A-1) and (A-2) are simultaneously introduced into the reactor and reacted, it is preferable to adjust the temperature of the reactor to a predetermined temperature in advance, and adjust the temperature inside the reactor to a predetermined temperature while performing simultaneous addition.

In the method of introducing (A-1) into the reactor after (A-2) is placed in the reactor in advance, it is preferable to adjust the temperature of the reactor charged with the chlorinating agent (A-2) to a predetermined temperature, and adjust the temperature inside the reactor to a predetermined temperature while introducing the organomagnesium compound (A-1) into the reactor.

In the method of introducing (A-2) into the reactor after (A-1) is placed in the reactor in advance, it is preferable to adjust the temperature of the reactor charged with (A-1) to a predetermined temperature, and adjust the temperature inside the reactor to a predetermined temperature while introducing (A-2) into the reactor.

In the reaction system of the organomagnesium compound (A-1) and the chlorinating agent (A-2), the concentration of (A-1) (magnesium concentration) is not particularly limited, but is preferably 0.8 mol/L or more and 2.5 mol/L or less, and more preferably 1.0 mol/L or more and 2.0 mol/L or less, in terms of enlarging the pores of the carrier (A-3) and making it fragile.

Next, the organomagnesium compound (A-4) will be described.

(A-4) is preferably one represented by the above (formula iii).

$$\text{(A-4)}:(M^2)_\alpha(Mg)_\beta(R^4)_a(R^5)_bY^1_c \qquad \text{(formula iii)}$$

(in formula iii, $M^2$ is a metal atom belonging to any one selected from the group consisting of groups 12, 13, and 14 of the periodic table, $R^4$ and $R^5$ are hydrocarbon groups having 2 or more and 20 or less carbon atoms, $Y^1$ is any of alkoxy, siloxy, aryloxy, amino, amido, —N═C—$R^6$, $R^7$, —$SR^I$ (wherein $R^6$, $R^7$, and $R^8$ represent hydrocarbon groups having 1 or more and 20 or less carbon atoms, and when c is 2, each $Y^1$ may be different), and a β-keto acid residue, and α, β, a, b, and c are real numbers that satisfy the following relationship:

$$0 \leq \alpha, 0<\beta, 0 \leq a, 0 \leq b, 0 \leq c, 0<a+b, 0 \leq c/(\alpha+\beta) \leq 2, n\alpha+2\beta=a+b+c$$

(wherein n represents the valence of $M^2$).)

Regarding the amount of the organomagnesium compound (A-4) used, the molar ratio of magnesium atoms contained in the organomagnesium compound (A-4) to titanium atoms contained in the titanium compound (A-5), Mg/Ti, is preferably 0.1 or more and 10 or less, and more preferably 0.5 or more and 5 or less.

The temperature of the reaction between the organomagnesium compound (A-4) and the titanium compound (A-5) is not particularly limited, but is preferably −80° C. or more and 150° C. or less, and more preferably −40° C. or more and 100° C. or less.

The concentration of the organomagnesium compound (A-4) when used is not particularly limited, but is preferably 0.1 mol/L or more and 2 mol/L or less, and more preferably 0.5 mol/L or more and 1.5 mol/L or less, based on magnesium atoms contained in the organomagnesium compound (A-4). An inert hydrocarbon solvent is preferably used to dilute the organomagnesium compound (A-4).

Next, the titanium compound (A-5) will be described.

The titanium compound (A-5) is a titanium compound represented by the following formula iv, as described above.

$$\text{(A-5): } Ti(OR^9)_d X^1_{(4-d)} \quad \text{(formula iv)}$$

(in formula iv, d is a real number of 0 or more and 4 or less, $R^9$ is a hydrocarbon group having 1 or more and 20 or less carbon atoms, and $X^1$ is a halogen atom.)

In the above (formula iv), d is preferably 0 or more and 1 or less, and more preferably 0.

The hydrocarbon group represented by $R^9$ in the (formula iv) is not particularly limited. Examples include aliphatic hydrocarbon groups, such as methyl, ethyl, propyl, butyl, pentyl, hexyl, 2-ethylhexyl, heptyl, octyl, decyl, and allyl groups; alicyclic hydrocarbon groups, such as cyclohexyl, 2-methylcyclohexyl, and cyclopentyl groups; aromatic hydrocarbon groups, such as phenyl and naphthyl groups; and the like. In particular, aliphatic hydrocarbon groups are preferred.

The halogen represented by $X^1$ is not particularly limited, and examples include chlorine, bromine, and iodine. In particular, chlorine is preferred.

The titanium compounds (A-5) may be used singly or as a mixture of two or more.

The amount of the titanium compound (A-5) used is not particularly limited; however, in terms of increasing the amount of support in the pores of the carrier, the molar ratio of titanium to magnesium atoms contained in the carrier (A-3), (Ti/Mg), is preferably 0.15 or more and 20 or less, and more preferably 0.2 or more and 10 or less.

The reaction temperature of the titanium compound (A-5) is not particularly limited, but is preferably −80° C. or more and 150° C. or less, and more preferably −40° C. or more and 100° C. or less.

The method for supporting the titanium compound (A-5) on the carrier (A-3) is not particularly limited, and a method of reacting the excess titanium compound (A-5) with the carrier (A-3), or a method of efficiently supporting the titanium compound (A-5) by using a third component may be used. In particular, a method of supporting the carrier (A-3) by reacting the titanium compound (A-5) with the organomagnesium compound (A-4) is preferred.

The order of addition of the organomagnesium compound (A-4) and the titanium compound (A-5) to the carrier (A-3) is not particularly limited. The titanium compound (A-5) may be added following the organomagnesium compound (A-4), the organomagnesium compound (A-4) may be added following the titanium compound (A-5), or the organomagnesium compound (A-4) and the titanium compound (A-5) may be added simultaneously.

In particular, it is preferable to add the organomagnesium compound (A-4) and the titanium compound (A-5) simultaneously.

The reaction between the organomagnesium compound (A-4) and the titanium compound (A-5) is performed in an inert hydrocarbon solvent, and it is preferable to use an aliphatic hydrocarbon solvent, such as hexane or heptane.

The catalyst obtained as described above is used as a slurry solution using an inert hydrocarbon solvent.

When the slurry solution is transferred, in terms of preventing the obtained catalyst from cracking until the polymerization process, it is preferable to add a thickener or control the pressure difference between the transfer source and the transfer destination to be small.

The thickener is not particularly limited, but is preferably a saturated hydrocarbon in terms of maintaining catalyst performance. Specific examples include liquid paraffin, polyolefin-based waxes, and the like.

The pressure difference between the transfer source and the transfer destination is not particularly limited, but is preferably 0.1 MPa or more and 0.5 MPa or less, and more preferably 0.1 MPa or more and 0.3 MPa or less.

Next, the organometallic compound component [B], which is used as a catalyst component in the polymerization of the polyethylene powder of the present embodiment, will be described.

As the catalyst used in the polymerization of the polyethylene powder of the present embodiment, a highly active solid catalyst for polymerization can be obtained by combining the solid catalyst component [A] described above with the organometallic compound component [B].

The organometallic compound component [B] is also referred to as a "cocatalyst."

The organometallic compound component [B] is preferably a compound containing any of metals belonging the group consisting of groups 1, 2, 12, and 13 of the periodic table, and particularly preferably an organoaluminum compound and/or an organomagnesium compound.

As the organoaluminum compound, it is preferable to use compounds represented by the following (formula v) singly or as a mixture.

$$AlR^{10}_j Z^1_{(3-j)} \quad \text{(formula v)}$$

(in formula v, $R^{10}$ is a hydrocarbon group having 1 or more and 20 or less carbon atoms, $Z^1$ is any group belonging to the group consisting of hydrogen, halogen, alkoxy, aryloxy, and siloxy groups, and j is a number of 2 or more and 3 or less.)

In the above (formula v), the hydrocarbon group having 1 or more and 20 or less carbon atoms represented by $R^{10}$ is not particularly limited, and examples include those containing aliphatic hydrocarbon, aromatic hydrocarbon, or alicyclic hydrocarbon. Specific preferred examples include trialkylaluminum, such as trimethylaluminum, triethylaluminum, tripropylaluminum, tributylaluminum, tri(2-methylpropyl)aluminum (or triisobutylaluminum), tripentylaluminum, tri(3-methylbutyl)aluminum, trihexylaluminum, trioctylaluminum, and tridecylaluminum; halogenated aluminum compounds, such as diethylaluminum chloride, ethylaluminum dichloride, bis(2-methylpropyl)aluminum chloride, ethylaluminum sesquichloride, and diethylaluminum bromide; alkoxyaluminum compounds, such as diethylaluminum ethoxide and bis(2-methylpropyl)aluminum butoxide; siloxyaluminum compounds, such as dimethylhydroxyaluminum dimethyl, ethylmethylhydroxyaluminum diethyl, and ethyldimethylsiloxyaluminum diethyl; and mixtures thereof.

In particular, trialkylaluminum compounds are more preferred.

The organomagnesium compound is preferably an organomagnesium compound represented by the above (formula i) and soluble in inert hydrocarbon solvents.

γ, δ, e, f, g, $M^1$, $R^1$, $R^2$, and $OR^3$ in the above (formula i) are as already described above; however, since it is preferable for this organomagnesium compound to have higher solubility in inert hydrocarbon solvents, β/α is preferably in the range of 0.5 to 10, and a compound wherein $M^1$ is aluminum is more preferred.

The method of adding the solid catalyst component [A] and the organometallic compound component [B] to a polymerization system under polymerization conditions is not particularly limited. Both components may be added separately to the polymerization system, or both components may be reacted in advance and then added to the polymerization system.

The ratio of both components to be combined is not particularly limited; however, the amount of the organometallic compound component [B] per gram of the solid catalyst component [A] is preferably 1 mmol or more and 3000 mmol or less.

(Polymerization Method of Ethylene-Based Polymer)

Examples of the polymerization method of the ethylene-based polymer that constitutes the polyethylene powder of the present embodiment include a method of polymerizing ethylene by suspension polymerization or gas-phase polymerization, and a method of copolymerizing ethylene and a comonomer.

Preferred among these is suspension polymerization, which can efficiently remove the heat of polymerization.

In suspension polymerization, an inert hydrocarbon medium can be used as a solvent. Further, an olefin itself can be used as a solvent.

The inert hydrocarbon medium is not particularly limited, and examples include aliphatic hydrocarbons, such as propane, butane, isobutane, pentane, isopentane, hexane, heptane, octane, decane, dodecane, and kerosene; alicyclic hydrocarbons, such as cyclopentane, cyclohexane, and methylcyclopentane; aromatic hydrocarbons, such as benzene, toluene, and xylene; halogenated hydrocarbons, such as ethyl chloride, chlorobenzene, and dichloromethane; and mixtures thereof.

In the method for producing the polyethylene powder of the present embodiment, the method of adding the above [catalyst component] into the polymerization reactor in the polymerization of the ethylene-based polymer is not particularly limited; however, in terms of polymerizing components with strong entanglement of molecular chains in the catalyst pores, and in terms of making the catalyst fragile in the polymerization system, it is preferable to add the [catalyst component] that has been pre-polymerized in advance.

In the method for producing the polyethylene powder of the present embodiment, the polymerization temperature of the ethylene-based polymer is preferably 40° C. or more and 100° C. or less, more preferably 45° C. or more and 95° C. or less, and even more preferably 50° C. or more and 90° C. or less.

A polymerization temperature of 40° C. or more enables industrially efficient production. In contrast, a polymerization temperature of 100° C. or less makes it possible to suppress massive scales generated when a part of the polymer melts, thus enabling continuous and stable production without pipe clogging.

In the method for producing the polyethylene powder of the present embodiment, the polymerization pressure of the ethylene-based polymer is preferably ordinary pressure or more and 2 MPaG or less, more preferably 0.2 MPaG or more and 1.5 MPaG or less, and even more preferably 0.3 MPaG or more and 0.9 MPaG or less.

A polymerization pressure equal to or higher than ordinary pressure enables industrially efficient production. In contrast, a polymerization pressure of 2 MPaG or less tends to enable stable production without generating massive scales in the polymerization reactor due to rapid polymerization.

In general, in the polymerization of an ethylene-based polymer, an antistatic agent, such as Stadis or STATSAFE produced by Innospec (distributor: Maruwa Bussan K.K.), can be used in order to prevent electrostatic adhesion of the polymer to the polymerization reactor.

The antistatic agent, such as Stadis or STATSAFE, can be diluted with an inert hydrocarbon medium and then added to the polymerization reactor by a pump or the like. The antistatic agent can be added, for example, by a method of adding it to a solid catalyst in advance or a method of adding it to the polymerization reactor. The amount of antistatic agent added is preferably 1 ppm or more and 500 ppm or less, and more preferably 10 ppm or more and 100 ppm or less, based on the production volume of the ethylene-based polymer per unit time.

The molecular weight of the ethylene-based polymer can be adjusted, for example, by allowing hydrogen to present in the polymerization system, or changing the polymerization temperature, as described in West German Patent Application No. 3127133.

Specifically, the molecular weight of the ethylene-based polymer can be controlled within an appropriate range by adding hydrogen as a chain transfer agent into the polymerization system. When adding hydrogen into the polymerization system, the range of the mole fraction of hydrogen is preferably 0 mol % or more and 30 mol % or less, and more preferably 0 mol % or more and 25 mol % or less.

Hydrogen can also be added into the polymerization system from the catalyst introduction line after being brought into contact with the catalyst in advance. Immediately after the catalyst is introduced into the polymerization system, the catalyst concentration near the introduction line outlet is high; thus, rapid polymerization proceeds and the possibility of localized high temperature conditions increases. In contrast, by bringing hydrogen into contact with the catalyst before introducing them into the polymerization system, the initial activity of the catalyst can be suppressed, and it is possible to prevent the generation of massive scales due to rapid polymerization and deactivation of the catalyst at high temperatures.

In the method for producing the ethylene-based polymer that constitutes the polyethylene powder of the present embodiment, the concentration range of the polymerization slurry is preferably 30 mass % or more and 60 mass % or less, and more preferably 40 mass % or more and 50 mass % or less, in terms of making the catalyst fragile in the polymerization system.

In the method for producing the ethylene-based polymer that constitutes the polyethylene powder of the present embodiment, the range of the stirring speed is preferably 300 rpm or more and 600 rpm or less, and more preferably 400 rpm or more and 500 rpm or less, in terms of making the catalyst fragile in the polymerization system.

The polymerization reaction may be performed in a batch, semi-continuous, or continuous manner, and preferably in a continuous manner.

By continuously supplying ethylene gas, a solvent, a catalyst, etc. into the polymerization system and continuously discharging them together with the produced ethylene polymer, it is possible to suppress a local high-temperature state caused by the rapid reaction of ethylene, which makes the inside of the polymerization system more stable. When ethylene is reacted in a homogeneous system, the formation of branches, double bonds, etc. in the polymer chains is suppressed, and the formation of low-molecular-weight components and ultra-high-molecular-weight substances due to decomposition and crosslinking of the ethylene polymer is suppressed, and crystalline components of the ethylene polymer are easily generated. As a result, in films, microporous membranes, and the like that use the polyethylene powder of the present embodiment, it becomes easier to obtain the crystalline components in an amount necessary and sufficient for strength.

The polymerization reaction may be performed by a single-stage polymerization method using one polymerization reactor, or a multistage polymerization method in which polymerization is performed continuously in sequence in two or more polymerization reactors connected in series.

The production of an ethylene-based polymer using a multistage polymerization method is specifically performed in the following manner.

First, an ethylene-based polymer X is produced in a first-stage polymerization reactor using the above production conditions, and the ethylene-based polymer X extracted from the first-stage polymerization reactor is transferred to an intermediate flash tank to separate unreacted ethylene, hydrogen, and comonomers (limited to copolymerization in the first-stage polymerization reactor). Then, the suspension containing the ethylene-based polymer X is transferred to a second-stage polymerization reactor, and an ethylene-based polymer Y is produced using the above production conditions.

The range of the polymerization pressure in the first-stage polymerization reactor is preferably 0.6 MPaG or more and 2.0 MPaG or less, more preferably 0.7 MPaG or more and 1.5 MPaG or less, and even more preferably 0.8 MPaG or more and 1.0 MPaG or less, in terms of polymerizing components with strong entanglement of molecular chains in the pores of the catalyst.

The concentration range of the polymerization slurry in the first-stage polymerization reactor is preferably 10 mass % or more and 30 mass % or less, and more preferably 10 mass % or more and 20 mass % or less, in terms of controlling the catalyst not to crack in the first-stage polymerization reactor.

The range of the stirring speed in the first-stage polymerization reactor is preferably 100 rpm or more and 300 rpm or less, and more preferably 150 rpm or more and 250 rpm or less, in terms of controlling the catalyst not to crack in the first-stage polymerization reactor.

The concentration range of the polymerization slurry in the second-stage polymerization reactor is preferably 30 mol % or more and 60 mol % or less, and more preferably 40 mol % or more and 50 mol % or less, in terms of making the catalyst fragile in the polymerization system.

The range of the stirring speed in the second-stage polymerization reactor is preferably 300 rpm or more and 600 rpm or less, and more preferably 400 rpm or more and 500 rpm or less, in terms of making the catalyst fragile in the polymerization system.

The range of the ratio of the ethylene-based polymer X contained in the polyethylene powder produced by the multistage polymerization method described above, that is, the production volume in the first-stage polymerization reactor, is preferably 10 mass % or more and 50 mass % or less, more preferably 15 mass % or more and 45 mass % or less, and even more preferably 20 mass % or more and 40 mass % or less, in terms of controlling the catalyst to crack in the second-stage polymerization reactor.

As the physical property values of the ethylene-based polymer Y, the viscosity average molecular weight and density can be determined in such a manner that after the physical property values of the ethylene-based polymer X extracted from the first-stage polymerization reactor and the finally produced polyethylene powder are measured, the viscosity average molecular weight and density can be determined based on additivity from the production volume of each polymerization reactor.

The suspension containing the ethylene-based polymer that constitutes the polyethylene powder of the present embodiment is quantitatively extracted from the polymerization reactor and transferred to the flash tank to separate unreacted ethylene, hydrogen, and comonomers (limited to copolymerization in the reactor).

As the solvent separation method in the polymerization process of the polyethylene powder of the present embodiment, any of decantation, centrifugal separation, filter filtration, and the like can be applied; however, centrifugal separation is more preferred because it can separate the ethylene-based polymer and the solvent efficiently.

The method of deactivating the catalyst used in the polymerization process of the ethylene-based polymer that constitutes the polyethylene powder of the present embodiment is not particularly limited; however, it is preferable to deactivate the catalyst after separating the ethylene-based polymer and the solvent.

By introducing an agent to deactivate the catalyst after separating the polyethylene powder and the solvent, low-molecular-weight components, catalyst components, etc. contained in the solvent can be prevented from being precipitated in the ethylene-based polymer.

Examples of catalyst-deactivating agents include oxygen, water, alcohols, glycols, phenols, carbon monoxide, carbon dioxide, ethers, carbonyl compounds, and alkynes.

In the method for producing the polyethylene powder of the present embodiment, a drying process is preferably performed after the ethylene-based polymer is separated from the solvent. In the drying process, it is preferable to use a rotary kiln method, a paddle method, a fluidized bed dryer, etc. The drying temperature is preferably 50° C. or more and 150° C. or less, and more preferably 70° C. or more and 110° C. or less.

It is also effective to introduce an inert gas such as nitrogen into the dryer to promote drying. In that case, a method of entraining steam etc. as an agent to deactivate the catalyst is also more effective.

After drying the ethylene-based polymer that constitutes the polyethylene powder of the present embodiment, the resultant may be sieved to remove coarse particles.

The polyethylene powder of the present embodiment may be a mixture of multiple polyethylene powders including an ethylene-based polymer obtained by the above production method.

If necessary, the polyethylene powder may be used in combination with known additives, such as slip agents, neutralizers, antioxidants, light-resistant stabilizers, antistatic agents, and pigments.

Examples of slip agents or neutralizers include, but are not particularly limited to, aliphatic hydrocarbons, higher fatty acids, higher fatty acid metal salts, fatty acid esters of alcohols, waxes, higher fatty acid amides, silicone oil, and rosin. Specifically, calcium stearate, magnesium stearate, zinc stearate, and other stearates can be used as preferable additives.

Preferred examples of antioxidants include, but are not particularly limited to, phenol-based compounds or phenol phosphate-based compounds. Specific examples include phenol-based antioxidants, such as 2,6-di-t-butyl-4-methylphenol(dibutylhydroxytoluene), n-octadecyl-3-(4-hydroxy-3,5-di-t-butylphenyl)propionate, and tetrakis(methylene(3,5-di-t-butyl-4-hysaloxyhydrocinnamate))methane; phenol phosphate-based antioxidants, such as 6-[3-(3-t-butyl-4-hydroxy-5-methylphenyl)propoxy]-2,4,8,10-tetra-t-butyldibenzo[d,f][1,3,2]dioxaphosphepin; and phosphate-based antioxidants, such as tetrakis(2,4-di-t-butylphenyl)-4,4'-biphenylene-di-phosphonite, tris(2,4 -di-t-butylphenyl) phosphite, and cyclic neopentanetetraylbis(2,4-t-butylphenylphosphite).

Examples of light-resistant stabilizers include, but are not particularly limited to, benzotriazole-based light-resistant stabilizers, such as 2-(5-methyl-2-hydroxyphenyl)benzotriazole and 2-(3-t-butyl-5-methyl-2-hydroxyphenyl)-5-chlorobenzotriazole; and hindered amine-based light-resistant stabilizers, such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}].

Examples of antistatic agents include, but are not particularly limited to, aluminosilicate, kaolin, clay, natural silica, synthetic silica, silicates, talc, diatomaceous earth, and glycerol fatty acid esters.

[Applications]

The polyethylene powder of the present embodiment can be used as a raw material for various molded articles, such as microporous membranes, fibers, particularly high-strength fibers, sintered compacts, press-molded articles, and ram press-molded articles.

In particular, the polyethylene powder of the present embodiment is suitable as a raw material for microporous membranes for battery separators.

[Molded Article]

The molded article of the present embodiment is a molded article of the polyethylene powder of the present embodiment described above.

Examples of the molded article include microporous membranes, particularly microporous membranes as battery separators, fibers, particularly high-strength fibers, sintered compacts, press-molded articles, and ram press-molded articles.

Examples of the method for producing the molded article include a molding method comprising the steps of extruding, drawing, extracting, and drying resin using a wet extrusion method.

Examples of the battery separator mentioned above include lithium ion secondary battery separators, and lead-acid battery separators.

EXAMPLES

The present embodiment will be described in more detail below by way of specific Examples and Comparative Examples; however, the present invention is not limited by the following Examples and Comparative Examples.

First, the methods for evaluating the physical properties of the polyethylene powder will be described.

[Physical Properties of Polyethylene Powder](Entanglement Index and Intermediate Component Ratio at 180° C.)

First, a sample tube filled with the polyethylene powder to a height of 1 cm from the bottom was placed in a TD-NMR system produced by Bruker (model: minispec mq20), which had been set so that the internal temperature of the sample tube was 30° C., and the sample tube was heated according to the <heating conditions> shown below.

The temperatures shown in the following <heating conditions> are values obtained by measuring the internal temperature of the sample with a thermocouple.

<Heating Conditions>

(1) Set to 30° C. and allow to stand for 5 minutes.

(2) Heat up to 180° C. at a rate of 5° C./min.

(3) After heating to 180° C., allow to stand for 25 minutes.

After completion of the temperature rise according to the above procedure, the spin-spin relaxation time ($T_2$, which is also referred to simply as "the relaxation time T" in the present specification) of the sample was measured according to the <measurement conditions> shown below.

Further, after completion of the measurement, the same measurement was repeated 3 times, and a total of 4 measurements were performed.

<Measurement Conditions>

Magnetic field strength: 0.47 T

Nuclide to be measured: $^1$H (20 MHz)

Measurement method: Carr-Purcell-Meiboom-Gill method

Cumulative number: 256 times

Repeat time: 3 seconds

Interval (τ) between first 90° pulse and 180° pulse: 0.04 milliseconds

Total number of echo signals: 6400

The free induction decay (FID) obtained by the 4th measurement out of the above 4 measurements was subjected to curve fitting using an analysis program TD-NMR-A produced by Bruker.

For fitting, the function shown in the following <formula 1> was used.

$$f(t)=R_\alpha\exp(-t/T_\alpha)+R_\beta\exp(-t/T_\beta)+R_\gamma\exp(-t/T_\gamma) \quad \text{<Formula 1>}$$

(provided that $R_\alpha+R_\beta+R_\gamma=100$)

t: variable (elapsed time from pulse irradiation)

$T_\alpha$: relaxation time (ms) of low-mobility component α

$R_\alpha$: abundance (%) of low-mobility component α

$T_\beta$: relaxation time (ms) of intermediate component 3

$R_\beta$: abundance (%) of intermediate component $ $T_\gamma$: relaxation time (ms) of high-mobility component γ

$R_\gamma$: abundance (%) of high-mobility component γ

Finally, from the relaxation time T and abundance R obtained by curve fitting of the free induction decay, the entanglement index (ms) and intermediate component ratio were calculated by (formula I) and (formula II) shown below.

$$(\text{Entanglement index})=T_\alpha\times R_\alpha/(R_\alpha+R_\beta)+T_\beta\times R_\beta/(R_\alpha+R_\beta) \quad \text{(formula I)}$$

$$(\text{Intermediate component ratio})=R_\beta/(R_\alpha+R_\beta) \quad \text{(formula II)}$$

(Rate of Change in Abundance of Low-Mobility Component at 180° C.)

When the above-mentioned (entanglement index and intermediate component ratio at 180° C.) are determined, the free induction decay (FID) obtained from the first and fourth measurements out of the pulsed NMR measurements was subjected to curve fitting using an analysis program TD-NMR-A produced by Bruker.

For fitting, the function shown in the above <formula 1> was used.

From the abundance R obtained by fitting, the rate of change (%) in the abundance of the low-mobility component was calculated by the following (formula III)

$$(\text{Rate of change in abundance of low-mobility component})=((R_{\alpha4}-R_{\alpha1})/R_{\alpha1})\times 100 \quad \text{(formula III)}$$

$R_{\alpha1}$: abundance (%) of the low-mobility component α in the first measurement $R_{\alpha4}$: abundance (%) of the low-mobility component α in the fourth measurement (Rate of Change in Abundance of High-Mobility Component at 180° C.)

When the above-mentioned (entanglement index and intermediate component ratio at 180° C.) are determined, the free induction decay (FID) obtained from the first and fourth measurements out of the pulsed NMR measurements was subjected to curve fitting using an analysis program TD-NMR-A produced by Bruker.

For fitting, the function shown in the above <formula 1> was used.

From the abundance R obtained by fitting, the rate of change (%) in the abundance of the high-mobility component shown in the following (formula IV) was calculated.

$$(\text{Rate of change in abundance of high-mobility component})=((R_{\gamma4}-R_{\gamma1})/R_{\gamma1})\times 100 \quad \text{(formula IV)}$$

$R_{\gamma1}$: abundance (%) of the high-mobility component γ in the first measurement $R_{\gamma4}$: abundance (%) of the high-mobility component γ in the fourth measurement

[Isothermal Crystallization Time]

The isothermal crystallization time at 125° C. in the polyethylene powder was determined in the following manner using a differential scanning calorimeter (product name: DSC8000, produced by PerkinElmer Japan Co., Ltd.).

First, an aluminum pan enclosing 8.5 mg of the polyethylene powder was placed in a heating furnace in the DSC device, and heating operations were performed according to the <heating and cooling conditions> shown below.

However, all of the heating operations were performed in a nitrogen atmosphere.

<Heating and Cooling Conditions>

(1) Hold at 50° C. for 1 minute.

(2) Heat up to 180° C. at a rate of 200° C./min.

(3) Hold at 180° C. for 5 minutes.

(4) Cool down to 125° C. at a rate of 80° C./min.

Then, the time when the temperature reached 125° C. was taken as the starting point (0 minutes), and the time at which the exothermic peak top caused by crystallization was obtained was taken as the isothermal crystallization time (min) at 125° C.

(Viscosity Average Molecular Weight (Mv))

The viscosity average molecular weight of the polyethylene powder was measured according to ISO1628-3 (2010) in the following manner.

First, the polyethylene powder was weighed in the range of 4.0 to 4.5 mg into a dissolution tube. The weighed mass is expressed as "m (unit: mg)" in the following mathematical formula. Next, after the air inside the dissolution tube was removed by a vacuum pump and replaced with nitrogen, 20 mL of decahydronaphthalene (containing 1 g/L of 2,6-di-t-butyl-4-methylphenol; hereinafter referred to as decalin) deaerated by a vacuum pump and replaced with nitrogen was added, and the mixture was stirred at 150° C. for 90 minutes to dissolve the polyethylene powder, thereby obtaining a decalin solution.

Thereafter, the decalin solution was placed in a Cannon-Fenske viscometer (produced by Sibata Scientific Technology Ltd./viscometer number: 100) in a constant temperature liquid bath at 135° C., and the falling time between gauge lines (ts) was measured.

Further, the falling time of decalin alone (tb) without the polyethylene powder was measured as a blank, and the specific viscosity (fsp) was determined according to the following (mathematical formula A).

$$\eta sp=(ts/tb)-1 \quad \text{(mathematical formula A)}$$

From the specific viscosity (fsp) and concentration (C) (unit: g/dL), the intrinsic viscosity IV was calculated using the following (mathematical formula B) and (mathematical formula C).

$$\text{Concentration } C=m/(20\times\gamma)/10 \text{ (unit: } g/dL) \quad \text{(mathematical formula B)}$$

$$\gamma=(\text{density of decalin at } 20^\circ \text{ C.})/(\text{density of decalin at } 135^\circ \text{ C.})=0.888/0.802=1.107$$

$$\text{Intrinsic viscosity IV}=(\eta sp/C)/(1+0.27\times\eta sp) \quad \text{(mathematical formula C)}$$

The intrinsic viscosity IV was assigned to the following (mathematical formula D) to determine the viscosity average molecular weight (Mv).

$$\text{Viscosity average molecular weight } (Mv)=(5.34\times 10^{4})\times[\eta]^{1.49} \quad \text{(mathematical formula D)}$$

(Median Diameter)

The median diameter of the polyethylene powder was determined in the following manner.

The polyethylene powder was classified with a sieve according to JIS Z8801 standard. The sieve mesh sizes used were 425 μm, 300 μm, 212 μm, 150 μm, 106 μm, 75 μm, and 53 μm, and the mass of the polyethylene powder collected for each fraction was measured. Then, the fraction (mass %) of each fraction to the total mass of the polyethylene powder before classification was calculated, and the cumulative undersize percentage (mass %) was determined. A cumulative undersize distribution graph with the horizontal axis representing the mesh size and the vertical axis representing the cumulative undersize percentage, that is, a particle size distribution cumulative curve (cumulative curve from small particles), was drawn, and the median diameter was defined as the particle diameter (D50 (μm)) at which the cumulative undersize percentage was 50%.

[Method for Producing Microporous Membrane]

1 part by mass of pentaerythrityl-tetrakis-[3-(3,5-di-t-butyl-4-hydroxyphenyl)propionate] was added as an antioxidant to 25 to 50 parts by mass of the polyethylene powder of each of the Examples and Comparative Examples, described later, and the mixture was dry-blended using a tumbler blender, thereby obtaining a powder mixture.

After nitrogen replacement, the obtained powder mixture was injected into a twin-screw extruder through a feeder under a nitrogen atmosphere.

Further, liquid paraffin (P-350P (trademark), produced by MORESCO Corporation), which was weighed so that the total of the liquid paraffin and the polyethylene powder was 100 parts by mass, was injected into the twin-screw extruder by side feeding. The mixture was kneaded at 200° C., extruded through a T-die installed at the tip of the extruder, and then immediately cooled and solidified on a cast roll cooled to 25° C. to form a gel-like sheet with a thickness of 1200 μm. This gel-like sheet was stretched 7×7 times at 115 to 125° C. using a simultaneous biaxial stretching machine to obtain a stretched film. After that, the stretched film was immersed in methyl ethyl ketone for 30 minutes to remove the liquid paraffin by extraction, followed by drying. The film was further heat-set at 115° C. to 125° C. for 3 minutes to obtain a microporous membrane.

The stretching temperature and heat-setting temperature were appropriately adjusted for each microporous membrane within the specified temperatures.

[Evaluation of Microporous Membrane]

(Evaluation of Molding Processability of Microporous Membrane)

The thickness uniformity of the microporous membrane was evaluated as an evaluation index of molding processability.

Specifically, 8 films of 100 mm×50 mm were punched out from the microporous membrane of 250 mm×250 mm obtained by the [Method for Producing Microporous Membrane] described above, and the thickness of each film was measured at 23° C. using a micro thickness gauge (model: KBM) produced by Toyo Seiki Co., Ltd.

The film thickness was measured at 3 points per punched film.

Then, the standard deviation of 24 measurements in total was calculated, and the molding processability was evaluated according to the following evaluation criteria.

(Evaluation Criteria)

⊚ (good): less than 0.5 m

○ (normal): 0.5 m or more and less than 1 m

X (bad): 1 m or more (Evaluation of Mechanical Strength of Microporous Membrane)

The puncture strength of the microporous membrane was evaluated as an evaluation index of mechanical strength.

Specifically, 8 films of 100 mm×50 mm were punched out from the microporous membrane of 250 mm×250 mm obtained by the [Method for Producing Microporous Membrane] described above, and the puncture strength of each film was measured using a compression tester (model: KES-G5) produced by Kato Tech Co., Ltd. under the conditions of a needle tip radius of curvature of 0.5 mm, a puncture speed of 2 mm/s, and 23° C. Measurements were performed at 3 points per punched film.

Further, the mass of each punched film was measured to determine the basis weight (film mass [g] per $m^2$), and the puncture strength in terms of basis weight was calculated from the following formula.

Then, the average of 24 measurements in total was calculated, and the mechanical strength was evaluated according to the following evaluation criteria.

$$\text{(Puncture strength in terms of basis weight)}=\text{(puncture strength }[N])/\text{(basis weight }[g/m^2])$$

(Evaluation criteria)

⊚ (good): 0.85 $N/(g/m^2)$ or more

○ (normal): 0.7 $N/(g/m^2)$ or more and less than 0.85 $N/(g/m^2)$

X (bad): less than 0.7 $N/(g/m^2)$ (Evaluation of Dimensional Stability of Microporous Membrane)

The heat shrinkage rate of the microporous membrane was evaluated as an evaluation index of dimensional stability.

Specifically, 8 films of 100 mm×50 mm were punched out from the microporous membrane of 250 mm×250 mm obtained by the [Method for Producing Microporous Membrane] described above, and allowed to stand in an oven set to 120° C. for 60 minutes.

After heating and standing, cooling was performed at room temperature for 15 minutes, the dimensions of the microporous membrane were measured, and the heat shrinkage rate (%) was calculated from the following formula.

Then, the average of 8 measurements in total was calculated, and the dimensional stability was evaluated according to the following evaluation criteria.

$$\text{(Heat shrinkage rate)}=\text{(heat shrinkage rate in the MD direction)}+\text{(heat shrinkage rate in the TD direction)}$$

$$\text{(Heat shrinkage rate in the MD direction)}=(1-D_{TD120}/D_{TD23})\times 100$$

$$\text{(Heat shrinkage rate in the TD direction)}=(1-D_{TD120}/D_{TD23})\times 100$$

$D_{MD120}$: dimension [mm] in the MD direction at 120° C.

$D_{MD23}$: dimension [mm] in the MD direction at 23° C.

$D_{TD120}$: dimension [mm] in the TD direction at 120° C.

$D_{TD23}$: dimension [mm] in the TD direction at 23° C.

(Evaluation criteria)

⊚ (good): less than 15%

○ (normal): 15% or more and less than 25%

X (bad): 25% or more (Evaluation of Creep Resistance of Microporous Membrane)

A sample with a width of 20 mm and a length of 100 mm was cut out from the microporous membrane obtained by the [Method for Producing Microporous Membrane] described above, and attached to TENSILON produced by A&D Company, Ltd. with a chuck distance of 50 mm. After holding for 12 hours at a temperature of 23° C. and a load of 10 N, the length of the microporous membrane was measured, and the tensile elongation (%) was calculated from the following formula.

Then, the creep resistance was evaluated according to the following evaluation criteria.

$$\text{(Tensile elongation)}=\{(L_{12h}/100)-1\}\times 100$$

$L_{12h}$: length [mm] of the microporous membrane after 12 hours (Evaluation criteria)

⊚ (good): less than 5%

○ (normal): 5% or more and less than 10%

X (bad): 10% or more

[Preparation of Ziegler-Natta Catalyst](Preparation of Ziegler-Natta Catalyst (A))

<(1) Synthesis of Raw Material (a-1)>

800 mL (equivalent to 2000 mmol of magnesium and aluminum) of a hexane solution of 2.5 mol/L of $Mg_6(C_4H_9)_{12}AL(C_2H_5)_3$ was placed in an 8L stainless steel autoclave fully purged with nitrogen. While stirring at 50° C., 146 mL of a 5.47 mol/L n-butanol hexane solution was added dropwise over 3 hours. After completion of dropping, the line was washed with 200 mL of hexane. Further, stirring was continued at 50° C. over 2 hours, and the reaction was performed.

After completion of the reaction, the resultant was cooled to room temperature and used as a raw material (a-1). The raw material (a-1) had a magnesium concentration of 1.5 mol/L.

<(2) Synthesis of Raw Material (a-2)>

2,000 mL (equivalent to 2000 mmol of magnesium and aluminum) of a hexane solution of 1 mol/L of $Mg_6(C_4H_9)_{12}AL(C_2H_5)_3$ was placed in an 8L stainless steel autoclave fully purged with nitrogen. While stirring at 80° C., 240 mL of a hexane solution of 8.33 mol/L of methylhydrogenpolysiloxane (produced by Shin-Etsu Chemical Co., Ltd.) was pumped, and stirring was further continued at 80° C. over 2 hours.

After completion of the reaction, the reactant was cooled to room temperature and used as a raw material (a-2).

The raw material (a-2) had a total concentration of magnesium and aluminum of 0.786 mol/L.

<(3) Synthesis of Carrier (a-3)>

333 mL of a hexane solution of 3 mol/L of hydroxytrichlorosilane was placed in an 8L stainless steel autoclave fully purged with nitrogen, 629 mL (equivalent to 943 mmol of magnesium) of a hexane solution of the organomagnesium compound as the raw material (a-1) was added dropwise at 80° C. over 3 hours, and the reaction was further continued while stirring at 80° C. for 1 hour.

After completion of the reaction, the supernatant was removed, followed by washing four times with 1,800 mL of hexane, thereby obtaining a carrier (a-3).

As a result of analyzing this carrier, 7.5 mmol of magnesium was contained per gram of solid.

<(4) Preparation of Ziegler-Natta Catalyst (A)>

To 1,970 mL of a hexane slurry containing 110 g of the carrier (a-3) stirred at 10° C. in an 8L stainless steel autoclave fully purged with nitrogen, 103 mL of a hexane solution of 1 mol/L of titanium tetrachloride and 131 mL of the raw material (a-2) were added simultaneously over 3 hours.

After addition, the reaction was continued at 10° C. for 1 hour. After completion of the reaction, the supernatant was removed, followed by washing four times with hexane to remove unreacted raw material components. Further, 10 vol % (volume ratio: liquid paraffin/(liquid paraffin+hexane)) of liquid paraffin (P-350P (trademark), produced by MORESCO Corporation) was added as a thickener, thereby preparing a Ziegler-Natta catalyst (A).

When the Ziegler-Natta catalyst (A) was transferred, the differential pressure between the transfer source and the transfer destination was set to 0.3 MPa.

(Preparation of Ziegler-Natta Catalyst (B))

Using a 1.6 L autoclave, 20 g of the Ziegler-Natta catalyst (A) was pre-polymerized. 800 mL of normal hexane was used as a solvent, 0.4 mmol of a mixture of triisobutylaluminum and diisobutylaluminum hydride (9:1) was used as a cocatalyst component, and 20 mol % (molar ratio: hydrogen/(ethylene+hydrogen)) of hydrogen was supplied. The polymerization temperature was 20° C., and ethylene was supplied so that 5 g of polyethylene was polymerized per gram of the Ziegler-Natta catalyst (A). After completion of the polymerization, the supernatant was removed, followed by washing four times with hexane to remove unreacted raw material components, thereby preparing a Ziegler-Natta catalyst (B). When the Ziegler-Natta catalyst (B) was transferred, the differential pressure between the transfer source and the transfer destination was set to 0.8 MPa.

(Preparation of Ziegler-Natta Catalyst (C))

<(5) Synthesis of Carrier (c-3)>

The operation was performed in the same manner as in the synthesis of the carrier (a-3), except that the reaction temperature was changed to 65° C., thereby obtaining a carrier (c-3). As a result of analyzing the carrier (c-3), 7.5 mmol of magnesium was contained per gram of solid.

<(6) Preparation of Ziegler-Natta Catalyst (C)>

The operation was performed in the same manner as in the preparation of the Ziegler-Natta catalyst (A), except that the carrier (c-3) was used in place of the carrier (a-3), and liquid paraffin was not added, thereby preparing a Ziegler-Natta catalyst (C). When the Ziegler-Natta catalyst (C) was transferred, the differential pressure between the transfer source and the transfer destination was set to 0.3 MPa.

(Preparation of Ziegler-Natta Catalyst (D))

<(7) Synthesis of Raw Material (d-1)>

The operation was performed in the same manner as in the synthesis of the raw material (a-1), except that 2,000 mL of a hexane solution of 1 mol/L of $Mg_6(C_4H_9)_{12}AL(C_2H_5)_3$ was used, and the amount of normal hexane used for line washing was changed to 300 mL, thereby obtaining a raw material (d-1). The raw material (d-1) had a magnesium concentration of 0.7 mol/L.

<(8) Synthesis of Carrier (d-3)>

The operation was performed in the same manner as in the synthesis of the carrier (a-3), except that 1340 mL of the raw material (d-1) was used in place of 629 mL of the raw material (a-1), and the reaction temperature was changed to 65° C., thereby obtaining a carrier (d-3). As a result of analyzing the carrier (d-3), 7.5 mmol of magnesium was contained per gram of solid.

<(9) Preparation of Ziegler-Natta Catalyst (D)>

The operation was performed in the same manner as in the preparation of the Ziegler-Natta catalyst (A), except that the carrier (d-3) was used in place of the carrier (a-3), and liquid paraffin was not added, thereby preparing a Ziegler-Natta catalyst (D). When the Ziegler-Natta catalyst (D) was transferred, the differential pressure between the transfer source and the transfer destination was set to 0.8 MPa.

(Preparation of Ziegler-Natta Catalyst (E))

The polymerization operation was performed in the same manner as in the preparation of the Ziegler-Natta catalyst (B), except that the Ziegler-Natta catalyst (D) was used in place of the Ziegler-Natta catalyst (A), thereby preparing a Ziegler-Natta catalyst (E). When the Ziegler-Natta catalyst (E) was transferred, the differential pressure between the transfer source and the transfer destination was set to 0.3 MPa.

(Preparation of Ziegler-Natta Catalyst (F))

To 1600 mL of hexane stirred at 5° C. in an 8L stainless steel autoclave fully purged with nitrogen, 786 mL of a hexane solution of 1 mol/L of titanium tetrachloride and 1000 mL of the raw material (a-2) were added simultaneously over 4 hours.

After addition, the temperature was slowly raised, and the reaction was continued at 10° C. for 1 hour.

After completion of the reaction, the supernatant was removed, followed by washing four times with hexane to remove unreacted raw material components, thereby preparing a Ziegler-Natta catalyst (F).

When the Ziegler-Natta catalyst (F) was transferred, the differential pressure between the transfer source and the transfer destination was set to 0.8 MPa.

(Preparation of Ziegler-Natta Catalyst (G))

10 vol % (volume ratio: liquid paraffin/(liquid paraffin+hexane)) of liquid paraffin (P-350P (trademark), produced by MORESCO Corporation) was added as a thickener to the Ziegler-Natta catalyst (F), thereby preparing a Ziegler-Natta catalyst (G).

When the Ziegler-Natta catalyst (G) was transferred, the differential pressure between the transfer source and the transfer destination was set to 0.8 MPa.

Production of Polyethylene Powder and Microporous Membrane

Example 1

As shown below, an ethylene-based polymer ($X_A$) was polymerized in the first-stage polymerization reactor, and an ethylene-based polymer ($Y_A$) was polymerized in the second-stage polymerization reactor, thereby obtaining a polyethylene powder (A).

The polyethylene powder (A) had a viscosity average molecular weight of 300,000 and a median diameter of 101 μm.

The above various evaluations were performed on the polyethylene powder (A), and a microporous membrane of the polyethylene powder (A) produced by the [Method for Producing Microporous Membrane] described above, and the results are shown in Table 1.

<(1) Polymerization of Ethylene-Based Polymer ($X_A$)>

The ethylene-based polymer was polymerized using a vessel type 300L polymerization reactor equipped with three swept-back stirring blades and three baffles. As a solvent, normal hexane was supplied at a flow rate of 40 L/h, the total liquid volume was adjusted so that the slurry concentration was 16 mass %, and the stirring speed was set to 200 rpm. As a polymerization catalyst, the Ziegler-Natta catalyst (A) was used and supplied so that the production speed of the ethylene-based polymer was 9.0 kg/h. STATSAFE 3000 (90 g/L) diluted with normal hexane was added to the polymerization catalyst in an amount of 20 mass ppm with respect to the production speed of the ethylene-based polymer. As a cocatalyst component, a mixture of triisobutylaluminum and diisobutylaluminum hydride (9:1) was used and supplied at 10 mmol/h. 26 mol % (molar ratio: hydrogen/(ethylene+hydrogen)) of hydrogen was supplied. The polymerization temperature was set to 60° C., the polymerization pressure was set to 0.7 MPaG, and the average residence time was set to 3.3 hours.

The thus-obtained ethylene-based polymer ($X_A$) had a viscosity average molecular weight of 300,000. Further, the polymerization activity in the first-stage polymerization reactor was 12,000 g per gram of the catalyst.

The polymerization slurry in the polymerization reactor was guided to an intermediate flash tank with a pressure of 0.05 MPaG and a temperature of 70° C. so that the level in the polymerization reactor was kept constant, and unreacted ethylene and hydrogen were separated in this intermediate flash tank.

<(2) Polymerization of Ethylene-Based Polymer ($Y_A$)>

The polymerization slurry containing the ethylene-based polymer ($X_A$) was transferred from the intermediate flash tank to a vessel type 300L polymerization reactor equipped with three swept-back stirring blades and three baffles, followed by polymerization of the ethylene-based polymer ($Y_A$).

The total liquid volume was adjusted so that the slurry concentration was 40 mass %, the stirring speed was set to 450 rpm, and as a cocatalyst component, a mixture of triisobutylaluminum and diisobutylaluminum hydride (9:1) was supplied at 10 mmol/h. 10 mol % (molar ratio: hydrogen/(ethylene+hydrogen)) of hydrogen was supplied. The polymerization temperature was set to 78° C., the polymerization pressure was set to 0.75 MPaG so that the production speed was 11.1 kg/h, and the average residence time was set to 0.75 hours.

The thus-obtained ethylene-based polymer ($Y_A$) had a viscosity average molecular weight of 300,000. Further, the polymerization activity in the second-stage polymerization reactor was 14,700 g per gram of the catalyst.

The polymerization slurry in the polymerization reactor was guided to a final flash tank with a pressure of 0.05 MPaG and a temperature of 70° C. so that the level in the polymerization reactor was kept constant, and unreacted ethylene and hydrogen were separated in this final flash tank.

Next, the polymerization slurry was continuously transferred by a pump from the flash tank to a centrifuge, and the polymer and the solvent were separated in the centrifuge. Then, the separated polyethylene powder was transferred to a rotary kiln dryer controlled to 90° C., and dried while blowing nitrogen, thereby obtaining a polyethylene powder (A). In this drying process, the polyethylene powder was sprayed with steam to deactivate the catalyst and cocatalyst.

Example 2

As shown below, an ethylene-based polymer ($X_B$) was polymerized in the first-stage polymerization reactor, and an ethylene-based polymer ($Y_B$) was polymerized in the second-stage polymerization reactor, thereby obtaining a polyethylene powder (B).

The polyethylene powder (B) had a viscosity average molecular weight of 900,000 and a median diameter of 99 μm.

The above various evaluations were performed on the polyethylene powder (B), and a microporous membrane of the polyethylene powder (B) produced by the [Method for Producing Microporous Membrane] described above, and the results are shown in Table 1.

<(3) Polymerization of Ethylene-Based Polymer ($X_B$)>

Polymerization was carried out in the same manner as in the polymerization of ($X_A$) in the (Example 1) above, except that the amount of hydrogen supplied was changed to 16 mol %, thereby obtaining an ethylene-based polymer ($X_B$). The obtained ethylene-based polymer ($X_B$) had a viscosity average molecular weight of 900,000. Further, the polymerization activity in the first-stage polymerization reactor was 13,000 g per gram of the catalyst.

<(4) Polymerization of Ethylene-Based Polymer ($Y_B$)>

Polymerization was carried out in the same manner as in the polymerization of ($Y_A$) in the (Example 1) above, except that the stirring speed was changed to 550 rpm and the amount of hydrogen supplied was changed to 2 mol %, thereby obtaining an ethylene-based polymer ($Y_B$).

The obtained ethylene-based polymer ($Y_B$) had a viscosity average molecular weight of 900,000. Further, the polymerization activity in the second-stage polymerization reactor was 15,900 g per gram of the catalyst.

The polymerization slurry in the polymerization reactor was separated and dried in the same manner as in the (Example 1) above, thereby obtaining a polyethylene powder (B).

Example 3

<(5) Polymerization of Polyethylene Powder (C)>

The polyethylene powder was polymerized using a vessel type 300L polymerization reactor equipped with three swept-back stirring blades and three baffles. As a solvent, normal hexane was supplied at a flow rate of 40 L/h, the total liquid volume was adjusted so that the slurry concentration was 40 mass %, and the stirring speed was set to 550 rpm. As a polymerization catalyst, the Ziegler-Natta catalyst (B) was used and supplied so that the production speed of the polyethylene powder was 13 kg/h. STATSAFE 3000 (90 g/L) diluted with normal hexane was added to the polymerization catalyst in an amount of 20 mass ppm with respect to the production speed of the polyethylene powder. As a cocatalyst component, a mixture of triisobutylaluminum and diisobutylaluminum hydride (9:1) was used and supplied at 10 mmol/h. 2.9 mol % (molar ratio: hydrogen/(ethylene+hydrogen)) of hydrogen was supplied. The polymerization temperature was set to 78° C., the polymerization pressure was set to 0.3 MPaG, and the average residence time was set to 3.0 hours. The polymerization slurry in the polymerization reactor was guided to a flash tank with a pressure of 0.05 MPaG and a temperature of 70° C. so that the level in the polymerization reactor was kept constant, and unreacted ethylene and hydrogen were separated in the flash tank. Next, the polymerization slurry was continuously transferred by a pump from the flash tank to a centrifuge, and the polymer and the solvent were separated. Then, the separated polyethylene powder was transferred to a rotary kiln dryer controlled to 90° C. and dried while blowing nitrogen. In this drying process, the polyethylene powder was sprayed with steam to deactivate the catalyst and cocatalyst.

The thus-obtained polyethylene powder (C) had a viscosity average molecular weight of 900,000 and a median diameter of 110 m. Further, the polymerization activity in the polymerization reactor was 20,000 g per gram of the catalyst.

The above various evaluations were performed on the polyethylene powder (C), and a microporous membrane of the polyethylene powder (C) produced by the [Method for Producing Microporous Membrane] described above, and the results are shown in Table 1.

Example 4

As shown below, an ethylene-based polymer ($X_D$) was polymerized in the first-stage polymerization reactor, and an ethylene-based polymer ($Y_D$) was polymerized in the second-stage polymerization reactor, thereby obtaining a polyethylene powder (D). The polyethylene powder (D) had a viscosity average molecular weight of 300,000 and a median diameter of 105 m.

The above various evaluations were performed on the polyethylene powder (D), and a microporous membrane of the polyethylene powder (D) produced by the [Method for Producing Microporous Membrane] described above, and the results are shown in Table 1.

<(6) Polymerization of Ethylene-Based Polymer ($X_D$)>

Polymerization was carried out in the same manner as in the polymerization of ($X_A$) in the (Example 1) above, except that the polymerization catalyst was changed to the Ziegler-Natta catalyst (C), thereby obtaining an ethylene-based polymer ($X_D$). The obtained ethylene-based polymer ($X_D$) had a viscosity average molecular weight of 300,000. Further, the polymerization activity in the first-stage polymerization reactor was 11,500 g per gram of the catalyst.

<(7) Polymerization of Ethylene-Based Polymer ($Y_D$)>

Polymerization was carried out in the same manner as in the polymerization of ($Y_A$) in the (Example 1) above, thereby obtaining an ethylene-based polymer ($Y_D$). The obtained ethylene-based polymer ($Y_D$) had a viscosity average molecular weight of 300,000. Further, the polymerization activity in the second-stage polymerization reactor was 14,000 g per gram of the catalyst.

The polymerization slurry in the polymerization reactor was separated and dried in the same manner as in the (Example 1) above, thereby obtaining a polyethylene powder (D).

Example 5

<(8) Polymerization of Polyethylene Powder (E)>

Polymerization was carried out in the same manner as in the (Example 3) above, except that the flow rate of normal hexane was changed to 80 L/h, the production speed was changed to 10 kg/h, the slurry concentration was changed to 16 mass %, and the average residence time was changed to 1.75 hours, thereby obtaining a polyethylene powder (E).

The thus-obtained polyethylene powder (E) had a viscosity average molecular weight of 900,000 and a median diameter of 108 m. Further, the polymerization activity in the polymerization reactor was 19,000 g per gram of the catalyst.

The above various evaluations were performed on the polyethylene powder (E), and a microporous membrane of the polyethylene powder (E) produced by the [Method for Producing Microporous Membrane] described above, and the results are shown in Table 1.

Example 6

As shown below, an ethylene-based polymer ($X_F$) was polymerized in the first-stage polymerization reactor, and an ethylene-based polymer ($Y_F$) was polymerized in the second-stage polymerization reactor, thereby obtaining a polyethylene powder (F).

The polyethylene powder (F) had a viscosity average molecular weight of 300,000 and a median diameter of 95 μm.

The above various evaluations were performed on the polyethylene powder (F), and a microporous membrane of the polyethylene powder (F) produced by the [Method for Producing Microporous Membrane] described above, and the results are shown in Table 1.

<(9) Polymerization of Ethylene-Based Polymer ($X_F$)>

Polymerization was carried out in the same manner as in the polymerization of ($X_A$) in the (Example 1) above, thereby obtaining an ethylene-based polymer ($X_F$). The obtained ethylene-based polymer ($X_F$) had a viscosity average molecular weight of 300,000. Further, the polymerization activity in the first-stage polymerization reactor was 12,000 g per gram of the catalyst.

<(10) Polymerization of Ethylene-Based Polymer ($Y_F$)>

Polymerization was carried out in the same manner as in the polymerization of ($Y_A$) in the (Example 1) above, except that the slurry concentration was changed to 30 mass % and the stirring speed was changed to 230 rpm, thereby obtaining an ethylene-based polymer ($Y_F$). The obtained ethylene-based polymer ($Y_F$) had a viscosity average molecular weight of 300,000. Further, the polymerization activity in the second-stage polymerization reactor was 14,500 g per gram of the catalyst.

The polymerization slurry in the polymerization reactor was separated and dried in the same manner as in the (Example 1) above, thereby obtaining a polyethylene powder (F).

Example 7

<(11) Polymerization of Polyethylene Powder (G)>

Polymerization was carried out in the same manner as in the (Example 3) above, except that the production speed was changed to 9 kg/h, the slurry concentration was changed to 30 mass %, and the amount of hydrogen supplied was changed to 1 mol %, thereby obtaining a polyethylene powder (G).

The thus-obtained polyethylene powder (G) had a viscosity average molecular weight of 2,000,000 and a median diameter of 103 m. Further, the polymerization activity in the polymerization reactor was 18,000 g per gram of the catalyst.

The above various evaluations were performed on the polyethylene powder (G), and a microporous membrane of the polyethylene powder (G) produced by the [Method for Producing Microporous Membrane] described above, and the results are shown in Table 1.

Example 8

As shown below, an ethylene-based polymer ($X_H$) was polymerized in the first-stage polymerization reactor, and an ethylene-based polymer ($Y_H$) was polymerized in the second-stage polymerization reactor, thereby obtaining a polyethylene powder (H). The polyethylene powder (H) had a viscosity average molecular weight of 900,000 and a median diameter of 99 m. The above various evaluations were performed on the polyethylene powder (H), and a microporous membrane of the polyethylene powder (H) produced by the [Method for Producing Microporous Membrane] described above, and the results are shown in Table 1.

<(12) Polymerization of Ethylene-Based Polymer ($X_H$)>

Polymerization was carried out in the same manner as in the polymerization of ($X_B$) in the (Example 2) above, except that the stirring speed was changed to 300 rpm and the slurry concentration was changed to 30 mass %, thereby obtaining an ethylene-based polymer ($X_H$). The obtained ethylene-based polymer ($X_H$) had a viscosity average molecular weight of 900,000. Further, the polymerization activity in the first-stage polymerization reactor was 13,000 g per gram of the catalyst.

<(13) Polymerization of Ethylene-Based Polymer ($Y_H$)>

Polymerization was carried out in the same manner as in the polymerization of ($Y_B$) in the (Example 2) above, except that the stirring speed was changed to 450 rpm, thereby obtaining an ethylene-based polymer ($Y_H$). The obtained ethylene-based polymer ($Y_H$) had a viscosity average molecular weight of 900,000. Further, the polymerization activity in the second-stage polymerization reactor was 15,900 g per gram of the catalyst.

The polymerization slurry in the polymerization reactor was separated and dried in the same manner as in the (Example 1) above, thereby obtaining a polyethylene powder (H).

Comparative Example 1

<(14) Polymerization of Polyethylene Powder (I)>

Polymerization was carried out in the same manner as in the (Example 5) above, except that the stirring speed was changed to 230 rpm and the polymerization catalyst was changed to the Ziegler-Natta catalyst (E), thereby obtaining a polyethylene powder (I).

The thus-obtained polyethylene powder (I) had a viscosity average molecular weight of 900,000 and a median diameter of 111 m.

Further, the polymerization activity in the polymerization reactor was 18,000 g per gram of the catalyst.

The above various evaluations were performed on the polyethylene powder (I), and a microporous membrane of the polyethylene powder (I) produced by the [Method for Producing Microporous Membrane] described above, and the results are shown in Table 2.

Comparative Example 2

<(15) Polymerization of Polyethylene Powder (J)>

Polymerization was carried out in the same manner as in the (Example 3) above, except that the polymerization catalyst was changed to the Ziegler-Natta catalyst (D), thereby obtaining a polyethylene powder (J).

The thus-obtained polyethylene powder (J) had a viscosity average molecular weight of 900,000 and a median diameter of 113 m. Further, the polymerization activity in the polymerization reactor was 18,500 g per gram of the catalyst.

The above various evaluations were performed on the polyethylene powder (J), and a microporous membrane of the polyethylene powder (J) produced by the [Method for Producing Microporous Membrane] described above, and the results are shown in Table 2.

Comparative Example 3

As shown below, an ethylene-based polymer ($X_K$) was polymerized in the first-stage polymerization reactor, and an ethylene-based polymer ($Y_K$) was polymerized in the second-stage polymerization reactor, thereby obtaining a polyethylene powder (K).

The polyethylene powder (K) had a viscosity average molecular weight of 900,000 and a median diameter of 94 μm.

The above various evaluations were performed on the polyethylene powder (K), and a microporous membrane of the polyethylene powder (K) produced by the [Method for Producing Microporous Membrane] described above, and the results are shown in Table 2.

<(16) Polymerization of Ethylene-Based Polymer ($X_K$)>

Polymerization was carried out in the same manner as in the polymerization of ($X_B$) in (Example 2) above, except that the stirring speed was changed to 450 rpm and the slurry concentration was changed to 30 mass %, thereby obtaining an ethylene-based polymer ($X_K$).

The obtained ethylene-based polymer ($X_K$) had a viscosity average molecular weight of 900,000. Further, the polymerization activity in the first-stage polymerization reactor was 12,500 g per gram of the catalyst.

<(17) Polymerization of Ethylene-Based Polymer ($Y_K$)>

Polymerization was carried out in the same manner as in the polymerization of ($Y_B$) in (Example 2) above, except that the stirring speed was changed to 230 rpm and the slurry concentration was changed to 20 mass %, thereby obtaining an ethylene-based polymer ($Y_K$). The obtained ethylene-based polymer ($Y_K$) had a viscosity average molecular weight of 900,000. Further, the polymerization activity in the second-stage polymerization reactor was 15,400 g per gram of the catalyst.

The polymerization slurry in the polymerization reactor was separated and dried in the same manner as in the (Example 1) above, thereby obtaining a polyethylene powder (K).

Comparative Example 4

<(18) Polymerization of Polyethylene Powder (L)>

Polymerization was carried out in the same manner as in the (Example 5) above, except that the stirring speed was changed to 230 rpm and the polymerization catalyst was changed to the Ziegler-Natta catalyst (D), thereby obtaining a polyethylene powder (L).

The thus-obtained polyethylene powder (L) had a viscosity average molecular weight of 900,000 and a median diameter of 99 m. Further, the polymerization activity in the polymerization reactor was 19,000 g per gram of the catalyst.

The above various evaluations were performed on the polyethylene powder (L), and a microporous membrane of the polyethylene powder (L) produced by the [Method for Producing Microporous Membrane] described above, and the results are shown in Table 2.

Comparative Example 5

As shown below, an ethylene-based polymer ($X_M$) was polymerized in the first-stage polymerization reactor, and an ethylene-based polymer ($Y_M$) was polymerized in the second-stage polymerization reactor, thereby obtaining a polyethylene powder (M).

The polyethylene powder (M) had a viscosity average molecular weight of 600,000 and a median diameter of 87 μm.

The above various evaluations were performed on the polyethylene powder (M), and a microporous membrane of the polyethylene powder (M) produced by the [Method for Producing Microporous Membrane] described above, and the results are shown in Table 2.

<(16) Polymerization of Ethylene-Based Polymer ($X_M$)>

Polymerization was carried out in the same manner as in the polymerization of ($X_B$) in the (Example 2) above, except that the flow rate of normal hexane was changed to 20 L/h, the slurry concentration was changed to 40 mass %, the polymerization catalyst was changed to the Ziegler-Natta catalyst (F), the production speed was changed to 13 kg/h, the amount of hydrogen supplied was changed to 6 mol %, the polymerization temperature was changed to 80° C., and the polymerization pressure was changed to 0.5 MPaG, thereby obtaining an ethylene-based polymer ($X_M$).

The obtained ethylene-based polymer ($X_M$) had a viscosity average molecular weight of 800,000. Further, the polymerization activity in the first-stage polymerization reactor was 70,000 g per gram of the catalyst.

<(17) Polymerization of Ethylene-Based Polymer ($Y_M$)>

Polymerization was carried out in the same manner as in the polymerization of ($Y_B$) in the (Example 2) above, except that the stirring speed was changed to 230 rpm, the production speed was changed to 7 kg/h, the amount of hydrogen supplied was changed to 25 mol %, the polymerization temperature was changed to 80° C., and the polymerization pressure was changed to 0.5 MPaG, thereby obtaining an ethylene-based polymer ($Y_M$). The obtained ethylene-based polymer ($Y_M$) had a viscosity average molecular weight of 150,000. Further, the polymerization activity in the second-stage polymerization reactor was 38,000 g per gram of the catalyst.

The polymerization slurry in the polymerization reactor was separated and dried in the same manner as in the (Example 1) above, thereby obtaining a polyethylene powder (M).

Comparative Example 6

As shown below, an ethylene-based polymer ($X_N$) was polymerized in the first-stage polymerization reactor, and an ethylene-based polymer ($Y_N$) was polymerized in the second-stage polymerization reactor, thereby obtaining a polyethylene powder (N).

The polyethylene powder (N) had a viscosity average molecular weight of 600,000 and a median diameter of 89 μm.

The above various evaluations were performed on the polyethylene powder (N), and a microporous membrane of the polyethylene powder (N) produced by the [Method for Producing Microporous Membrane] described above, and the results are shown in Table 2.

<(16) Polymerization of Ethylene-Based Polymer ($X_N$)>

Polymerization was carried out in the same manner as in the polymerization of ($X_M$) in the (Comparative Example 5) above, except that the polymerization catalyst was changed to the Ziegler-Natta catalyst (G), thereby obtaining an ethylene-based polymer ($X_N$).

The obtained ethylene-based polymer ($X_N$) had a viscosity average molecular weight of 800,000. Further, the polymerization activity in the first-stage polymerization reactor was 70,000 g per gram of the catalyst.

<(17) Polymerization of Ethylene-Based Polymer ($Y_N$)>

Polymerization was carried out in the same manner as in the polymerization of ($Y_M$) in the (Comparative Example 5) above, thereby obtaining an ethylene-based polymer ($Y_N$). The obtained ethylene-based polymer ($Y_N$) had a viscosity average molecular weight of 150,000. Further, the polymerization activity in the second-stage polymerization reactor was 38,000 g per gram of the catalyst.

The polymerization slurry in the polymerization reactor was separated and dried in the same manner as in the (Example 1) above, thereby obtaining a polyethylene powder (N).

TABLE 1

| | Evaluation item | Example 1 | Example 2 | Example 3 | Example 4 | Example 5 | Example 6 | Example 7 | Example 8 |
|---|---|---|---|---|---|---|---|---|---|
| Polyethylene powder | Entanglement index (ms) | 17 | 19 | 20 | 18 | 17 | 12 | 22 | 24 |
| | Intermediate component ratio | 0.3 | 0.36 | 0.38 | 0.27 | 0.29 | 0.25 | 0.37 | 0.47 |
| | Rate of change (%) in abundance of low-mobility component | 0.2 | 3.5 | 4.2 | −1.5 | 6.3 | −0.5 | 5.6 | 5.2 |
| | Rate of change (%) in abundance of high-mobility component | 0.4 | 42 | 40 | 1.1 | 55 | 0.6 | 30 | 45 |
| | Isothermal crystallization time (min) at 125° C. | 3.8 | 1.5 | 1.7 | 5.1 | 2.1 | 5.3 | 3.3 | 1.3 |
| | Viscosity average molecular weight (10,000) | 30 | 90 | 90 | 30 | 90 | 30 | 200 | 90 |
| | Median diameter (μm) | 101 | 99 | 110 | 105 | 108 | 95 | 103 | 99 |
| Microporous membrane | Molding processability | ◎ | ◎ | ◎ | ○ | ◎ | ○ | ◎ | ◎ |
| | Mechanical strength | ◎ | ◎ | ◎ | ◎ | ◎ | ○ | ◎ | ○ |
| | Dimensional stability | ◎ | ◎ | ◎ | ◎ | ○ | ◎ | ◎ | ◎ |
| | Creep resistance | ◎ | ○ | ○ | ○ | ○ | ◎ | ○ | ○ |

TABLE 2

| | Evaluation item | Comparative Example 1 | Comparative Example 2 | Comparative Example 3 | Comparative Example 4 | Comparative Example 5 | Comparative Example 6 |
|---|---|---|---|---|---|---|---|
| Polyethylene powder | Entanglement index (ms) | 27 | 28 | 26 | 28 | 26 | 27 |
| | Intermediate component ratio | 0.55 | 0.6 | 0.53 | 0.58 | 0.56 | 0.58 |
| | Rate of change (%) in abundance of low-mobility component | 9 | 12 | −0.5 | 13 | −6 | −3 |
| | Rate of change (%) in abundance of high-mobility component | 48 | 57 | 55 | 59 | 65 | 65 |
| | Isothermal crystallization time (min) at 125° C. | 5.9 | 2.1 | 4.2 | 5.3 | 3.5 | 3.9 |
| | Viscosity average molecular weight (10,000) | 90 | 90 | 90 | 90 | 60 | 60 |
| | Median diameter (μm) | 111 | 113 | 94 | 99 | 87 | 89 |
| Microporous membrane | Molding processability | × | × | ○ | × | ○ | ○ |
| | Mechanical strength | × | × | × | × | × | × |
| | Dimensional stability | ○ | ○ | ○ | × | ○ | ○ |
| | Creep resistance | × | × | × | × | × | × |

The present application is based on a Japanese patent application (Japanese Patent Application No. 2020-196103) filed with the Japan Patent Office on Nov. 26, 2020, the contents of which are incorporated herein by reference.

INDUSTRIAL APPLICABILITY

The polyethylene powder of the present invention is industrially applicable as a raw material for various molded articles, microporous membranes, battery separators, and fibers.

The invention claimed is:

1. A polyethylene powder, wherein, when a free induction decay curve obtained by the Carr-Purcell-Meiboom-Gill method in pulsed NMR is subjected to three-component approximation, a relaxation time T of each component and an abundance R of each component satisfy the following <requirement (1)> and <requirement (2)>:

<Requirement (1)> an entanglement index at 180° C. determined by the following (formula I) is 12 ms or more and 25 ms or less:

$$(\text{entanglement index})=T_\alpha\times R_\alpha/(R_\alpha+R_\beta)+T_\beta\times R_\beta/(R_\alpha+R_\beta) \quad \text{(formula 1)}$$

$T_\alpha$: relaxation time (ms) of low-mobility component α

$R_\alpha$: abundance (%) of low-mobility component α

$T_\beta$: relaxation time (ms) of intermediate component β

$R_\beta$: abundance (%) of intermediate component β

<Requirement (2)> an intermediate component ratio at 180° C. determined by the following (formula II) is 0.25 or more and 0.5 or less:

$$(\text{intermediate component ratio})=R_\beta/(R_\alpha+R_\beta) \quad \text{(formula II).}$$

2. The polyethylene powder according to claim 1, wherein, regarding the abundance R of each component determined by subjecting a free induction decay curve obtained by the Carr-Purcell-Meiboom-Gill method in pulsed NMR to three-component approximation, a rate of change in an abundance of the low-mobility component at 180° C. is −5% or more and 10% or less.

3. The polyethylene powder according to claim 1, wherein, regarding the abundance R of each component determined by subjecting a free induction decay curve obtained by the Carr-Purcell-Meiboom-Gill method in pulsed NMR to three-component approximation, the rate of change in the abundance of the high-mobility component at 180° C. is 50% or less.

4. The polyethylene powder according to claim 1, which has an isothermal crystallization time at 125° C. of 5 minutes or less.

5. The polyethylene powder according to claim 1, which has a viscosity average molecular weight of 200,000 g/mol or more and 10,000,000 g/mol or less.

6. The polyethylene powder according to claim 1, which has a median diameter of 50 μm or more and 250 μm or less.

7. The polyethylene powder according to claim 1, which is for use in a battery separator.

8. A molded article of the polyethylene powder according to claim 1.

9. The molded article according to claim 8, which is a microporous membrane.

10. The molded article according to claim 8, which is a fiber.

11. The molded article according to claim 8, which is a battery separator.

* * * * *